(12) United States Patent
Ghebremeskel et al.

(10) Patent No.: US 12,065,599 B2
(45) Date of Patent: Aug. 20, 2024

(54) KITS AND COMPOSITIONS CONTAINING VINYL ALCOHOL POLYMERS AND FIBERS

(71) Applicant: Kuraray Co., Ltd., Okayama (JP)

(72) Inventors: Ghebrehiwet Ghebremeskel, Houston, TX (US); Keisuke Morikawa, Houston, TX (US); Takuma Kaneshima, Houston, TX (US)

(73) Assignee: Kuraray Co., Ltd., Okayama (JP)

( * ) Notice: Subject to any disclaimer, the term of this patent is extended or adjusted under 35 U.S.C. 154(b) by 0 days.

(21) Appl. No.: 17/406,532

(22) Filed: Aug. 19, 2021

(65) Prior Publication Data

US 2022/0056330 A1 Feb. 24, 2022

Related U.S. Application Data

(60) Provisional application No. 63/067,636, filed on Aug. 19, 2020.

(51) Int. Cl.
| | |
|---|---|
| *E21B 43/26* | (2006.01) |
| *C09K 8/508* | (2006.01) |
| *C09K 8/516* | (2006.01) |
| *C09K 8/582* | (2006.01) |
| *E21B 21/00* | (2006.01) |

(52) U.S. Cl.
CPC ............ *C09K 8/516* (2013.01); *C09K 8/5083* (2013.01); *E21B 21/003* (2013.01); *C09K 2208/08* (2013.01)

(58) Field of Classification Search
None
See application file for complete search history.

(56) References Cited

U.S. PATENT DOCUMENTS

2010/0075872 A1* 3/2010 Nguyen .................. C09K 8/68
507/224

FOREIGN PATENT DOCUMENTS

CA 2868331 A1 * 11/2012 ............. C09K 8/516

OTHER PUBLICATIONS

Aruldass et al. S. Aruldass, V. Mathivanan, A.R. Mohamed, C.T. Tye, Factors affecting hydrolysis of polyvinyl acetate to polyvinyl alcohol, Journal of Environmental Chemical Engineering, vol. 7, Issue 5, 2019, 103238, ISSN 2213-3437 (Year: 2019).*
CA 2860659 Jul. 11, 2013 (Year: 2013).*

* cited by examiner

*Primary Examiner* — Charles R Nold
(74) *Attorney, Agent, or Firm* — Morgan, Lewis & Bockius LLP

(57) ABSTRACT

Disclosed are compositions and kits of fibers and acid-functional vinyl alcohol polymers, wherein such compositions and kits are useful for wellbore remediation as applied to a subterranean formation traversed by the borehole of an oil or gas well.

23 Claims, No Drawings

KITS AND COMPOSITIONS CONTAINING VINYL ALCOHOL POLYMERS AND FIBERS

FIELD OF THE INVENTION

This invention relates to a particulate compositions based on a blend of a polyvinyl alcohol polymer with various fibers. Such particulate compositions have an appropriate solubility profile for use in a number of fields, including in various subsurface production operations, as such as a diverting agents and/or loss circulation materials, during the process of drilling, workover, completion and cementing in the production of oil and gas. The vinyl alcohol polymers and fibers can also be used with equally good results as separate members of a kit.

BACKGROUND OF THE INVENTION

Polyvinyl alcohol ("PVOH") is a well-known and versatile industrial material. It is routinely used for the purpose of fabricating films, fibers and shaped objects such as containers and devices for packaging, drug delivery and wound management. It is also experiencing growing use as a component in various compositions employed for the purpose of adjusting the permeability of a subterranean formation that is traversed by the borehole of a well drilled to enable the production of hydrocarbons and/or other valuable materials.

During the drilling of a wellbore in a subterranean geologic formation, various fluids, known generically as mud or mud compositions, are typically used in the well for a variety of functions. Fluid compositions used downhole may be water-based or oil-based, and may contain weighting agents, surfactants, proppants, polymers or other kinds of servicing components for other purposes. The fluids may be circulated through a drill pipe and drill bit down into the depth of the wellbore, and then should subsequently flow upward through the annulus of the wellbore to the surface. During this circulation, the wellbore fluid may act to perform needed operations such as to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

During these operations, the fluids exert hydrostatic and pumping pressure against the subterranean rock formations, but the formation rock frequently has pathways through which the fluids may escape the wellbore. Undesirable formation conditions can be encountered in which substantial amounts or, in some cases, practically all of the wellbore fluid may be lost to the formation. For example, wellbore fluid can leave the borehole through natural or induced fissures or fractures in the formation, through a highly porous rock matrix surrounding the borehole, or in formations that are fractured, highly permeable, porous, cavernous or vugular. The geologic formations into which wellbore fluids can be lost include those composed of earthen material such as shale, sands, gravel, shell beds, reef deposits, limestone, dolomite and chalk.

For a wellbore fluid to perform all of its functions and allow wellbore operations to continue, however, the fluid must stay in the borehole since the fluid is intended to pass down the borehole and circulate back up the annulus outside of the drill string or casing to the mud tanks. Unfortunately, induced fluid losses may occur when the fluid weight required for well control and to maintain a stable wellbore exceeds the fracture resistance of the formations. Loss of wellbore fluid into downhole formations, is a recurring problem in drilling operations There are various types of fluid loss. One type involves the loss of carrier fluid to the formation, leaving suspended solids behind. Another involves the escape of the entire fluid, including suspended solids, into the formation. The latter situation is called "lost circulation", and it can be an expensive and time-consuming problem. The loss may vary from a gradual lowering of the mud level in the tanks to a complete loss of returns. Lost circulation can also pose a safety hazard, leading to well-control problems and environmental incidents. During cementing, for example, lost circulation may severely compromise the quality of the cement job, reducing annular coverage, leaving casing exposed to corrosive downhole fluids, and/or failing to provide adequate zonal isolation.

In many cases, a subterranean formation may include two or more intervals having varying permeability and/or injectivity. Some intervals may possess relatively low (or lower) injectivity, or ability to accept injected fluids, due to relatively low permeability, high in-situ stress and/or formation damage. When performing well servicing operations, a wellbore fluid constituting or containing a well-servicing component to accomplish an activity such as acidizing, stimulating, work over, fracturing, sand control, or cementing may be pumped down the borehole. When performing well servicing operations on multiple intervals having variable injectivity, however, it is often the case that most, if not all, of the servicing fluid pumped downhole will be displaced into one, or only a few, of the intervals having the highest injectivity. The intervals of highest injectivity may not be the desired destination for the servicing fluid being provided to that location in the wellbore.

In an effort to more evenly distribute wellbore fluids into the interval, or into each of the multiple intervals, being serviced, methods and materials for diverting servicing fluids away from areas of higher permeability and/or injectivity that are not the desired destination have been developed. Chemical agents are known that generally create a cake of solid particles in front of high-permeability layers, thus diverting fluid flow to less-permeable zones, and this occurs primarily as the result of suction of the fluid onto the permeable surface (pressure greater in the well than in the formation) and the creation of a mud cake to seal a porous formation. Because entry of a wellbore fluid into a zone that is wholly or partly plugged, sealed or blocked by the presence of a cake is limited by the cake resistance, a diverting agent enables the fluid flow to equalize between zones of different permeabilities. Materials in a diverting agent that cause cake formation do so largely by providing a bridging effect, and are typically solids of various sizes and shapes such as granular, lamellar, fibrous, and mixtures thereof to plug the passageways in and out of leaking zones. When fluids containing such materials are pumped into the wellbore, the materials will tend to congregate against and seat themselves in the pathways in the formation rock through which wellbore fluids may most easily flow, thus providing and adding to the desired bridging effect.

To provide such a bridging effect and assist in cake formation, the size of the materials contained in a diverting agent is sometimes chosen according to the pore-size and permeability range of the formation intervals. When the materials are chosen according to the size of the voids or cracks in the subterranean formation that is not a desired target for servicing, and as fluid escapes into the formation, the materials accumulate and build a barrier that minimizes or stops further flow.

After a diverting agent is put in place, however, and well servicing has occurred, the effect performed by the diverting agent must usually be reversed to maximize the post-treatment permeability of the serviced interval or intervals such that formation fluids such as hydrocarbons may thereafter be produced. It is thus important that a diverting agent enable quick and easy post-servicing cleanup. If, conversely, a diverting agent remains in formation pores, or continues to coat the formation surfaces, production will be undesirably, and sometimes unacceptably, hindered. The exception to the usual desire for the removal of a diverting agent after servicing is the case where lost circulation is occurring, and where an opening in the geologic formation is of such size that it must be permanently closed.

Typically, then it is desired that diverting agents be degradable, by which is meant that through a chemical reaction or process, or by the physical effects of adjusting the environmental conditions, the diverting agent is caused to be dissipated or debased to the extent that its presence becomes non-detectable, or negligible at most. Actions or events that can cause or promote such degradation include chemical and/or physical factors such as melting, pyrolysis, hydrolysis, solvation, oxidation, or dissolution. If desired, a chemical composition may be introduced into the wellbore to aid in the degradation of a diverting agent, which compositions may include without limitation acidic fluids, basic fluids, solvents, steam or a combination thereof. In some embodiments, a diverting agent that is subjected to such effects may degrade in a time period ranging from about 1 hour to 72 hours. Diverting agents that have been degraded in this manner generally do not require an additional step of retrieving them from the wellbore since they typically do not leave an undesirable residue in the formation.

Polyvinyl alcohol is finding favor as a component in compositions formed for injection or insertion into the subterranean geology traversed by a borehole because its solubility in water and other solvents, in the presence of the different types of environments found in the borehole, can be modified, thus increasing the likelihood that degradation of such a composition can be easily obtained when desired. See, for example, WO2006/088603A1, WO2018/231236A1, WO2019/031613A1, US2020/0071592A1, US2020/0071597A1, US2020/0071599A1, US2020/0071605A1, U.S. Provisional Appln. Ser. No. 62/967,956 (filed 30 Jan. 2020), U.S. Provisional Appln. Ser. No. 62/967,940 (filed 30 Jan. 2020), U.S. Provisional Appln. Ser. No. 62/982,199 (filed 27 Feb. 2020), and U.S. Provisional Appln. Ser. No. 63/029,153 (filed 22 May 2020).

Polyvinyl alcohol optionally in combination with other materials have also been described as a fluid loss additive for use in cement for cementing oil and gas well bores. See, for example, U.S. Pat. Nos. 5,105,885, 5,207,831, US2006/0041060A1 and EP0587383A1.

Degradability can be affected by the presence of other components in the composition.

One additional component that is sometimes used in plugging agent compositions being devoted to systems and products designed for use in the subterranean treatment of hydrocarbon wellbores is a fiber. Fibers can be a valuable component in a composition to be used as a diverting agent in cases where the size of particles contained in the diverting material is large, and the material attaches to the face of the formation without completely filling or sealing the porosity of the formation, or in cases where size of the diverting material is small, and the particulate diverting material becomes lodged into the pores or forms a bridge between at least two pore throats. Fibers are useful in such situations since they help create a porous web or mat that filters out solids in the fluid, accelerating the formation of a low-permeability filter cake that can plug or bridge the zones to be closed off. A wide variety of fibers is available to the oilfield made, for example, from materials such as natural organic and inorganic materials as well as synthetic polymers. Most are available in various shapes, sizes, and flexibilities.

Although the use of compositions containing fibers in the context of subterranean wellbore treatment is discussed in the art, it appears that little attention has been given to the fact that fiber-containing compositions, while forming durable plugs for leaking formations, need nevertheless to be relatively easy to degrade. For example, US2015/0166870A1 discloses using a "stiff" fibers and solid particles in a composition for treating subterranean wellbores in which a further component, a fluid loss control agent, can be selected from a list of more than forty polymers, one of which is polyvinyl alcohol. Substantial discussion and data are presented concerning the virtuous performance of the composition as a lost circulation material, but this reference offers limited guidance concerning ways to use this composition that do not impair, and preferably improve, polymeric properties or characteristics, particularly solubility, that would be beneficial when it is desired to effect degradation of the composition after well servicing is complete.

It thus remains desirable to have particulate polyvinyl alcohol compositions containing a fiber, and processes and methods for providing and using them, wherein the compositions have improved utility and performance for use in downhole operations by reason of a desirably attractive solubility performance, and ease of degradability.

SUMMARY OF THE INVENTION

In view of the above described need in the art to obtain and provide improved PVOH compositions for use in wellbore servicing fluids, it is proposed herein to provide such compositions that are characterized by a desirably broad range of solubilities, and that may thus be more advantageously selected for use in specific downhole treatment situations in view of their relative ease of degradability. And such compositions may further be provided in the form of separate components in a kit.

It is therefore proposed, in one aspect of this invention, to provide a composition that comprises a blend of a particulate polyvinyl alcohol component and a fiber component, wherein the particulate polyvinyl alcohol component comprises a polyvinyl alcohol resin and a plasticizer, and the fiber component comprises one or more fibers.

In another aspect, this invention provides a kit that includes a supply of a particulate polyvinyl alcohol component, and a supply of fiber component that is suitable for interaction with the particulate polyvinyl alcohol copolymer for the purpose of wellbore remediation, wherein the particulate polyvinyl alcohol component comprises a polyvinyl alcohol resin and a plasticizer, and the fiber component comprises one or more fibers.

In one embodiment, the particulate polyvinyl alcohol component comprises one or more acid-functional polyvinyl resins selected from the group consisting of:

(i) an at least partially hydrolyzed copolymer of vinyl acetate with one or more acid-functional comonomers, (ii) a polyvinyl alcohol homopolymer that has been modified to impart acid functionality, and (iii) a polyvinyl alcohol copolymer that has been modified to impart acid functionality.

In yet another aspect, this invention provides a method of reducing the flow of fluid from a wellbore installed within a subterranean, geologic formation into the formation through an opening in a wall of the wellbore by introducing the composition hereof into the opening in the wall.

In yet another aspect, this invention provides a method of reducing the flow of fluid from a wellbore installed within a subterranean, geologic formation into the formation through an opening in a wall of the wellbore by introducing a particulate polyvinyl alcohol component into the opening in the wall, and introducing a fiber component into the opening in the wall, wherein the particulate polyvinyl alcohol and fiber components are introduced into the opening simultaneously, or the particulate polyvinyl alcohol component is introduced into the opening before the fiber component, or the fiber component is introduced into the opening before the particulate polyvinyl alcohol component; and wherein the particulate polyvinyl alcohol component comprises a polyvinyl alcohol resin and a plasticizer, and the fiber component comprises one or more fibers.

In yet another aspect, this invention provides the product prepared by or resulting from any one of the processes or methods set forth herein.

The compositions of this invention have suitable stability for sufficient time periods to be useful in subterranean formations wherein downhole temperatures typically can range from about 100° F. up to about 250° F., although, in most cases, these compositions are used at temperatures in the range of about 190° F. to about 210° F. A particular advantage of the polyvinyl alcohol-based compositions hereof for downhole applications is that they are environmentally friendly since they are temporary, and are considered non-toxic and biodegradable.

These and other embodiments, features and advantages of this invention will be more readily understood by those of ordinary skill in the art from a reading of the following detailed description.

DETAILED DESCRIPTION

This invention relates to combinations of particulate polyvinyl alcohol-based components and fiber components, that have a solubility performance that is modifiable in view of the polymeric properties and characteristics of the composition. These compositions can be manufactured by means of a variety of processes that can involve, for example, granulation, compaction, crushing, mixing and/or melt processing, and find substantial use in downhole applications in subterranean treatments, and in various manufacturing operations.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute. Pressure differences, however, are expressed as absolute (for example, pressure 1 is 25 psi higher than pressure 2).

In certain instances, a quantitative value set forth herein may be determined by an analytical or other measurement method that is defined by reference to a published or otherwise recognized standard procedure. Typical examples of sources of such recognized standard procedures include ASTM (American Society for Testing Materials, now ASTM International); ISO (International Organization for Standardization); DIN (Deutsches Institut für Normung); and JIS (Japanese Industrial Standards). Unless clearly stated otherwise herein, the specific standard procedure used herein is considered to be the version of that procedure that is in force on the filing date of this application.

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When a range of values is stated as being "less than" or "no more than" a designated quantity (or other equivalent phrasing), it is to be understood that the range is bounded on the low end by an unspecified non-zero value. Correspondingly, when a range of values is stated as being "more than", "greater than", or "not less than" a designated quantity (or other equivalent phrasing), it is to be understood that the range on the high end is not infinite, and that it is bounded on the high end by an unspecified finite value.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of claim elements is not necessarily limited to only those elements but can include other elements not expressly listed or inherent to such process, method, article, or apparatus.

The transitional phrase "consisting of" excludes any claim element or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified claim elements, materials or steps and those others that do not materially affect the basic and novel characteristic(s) of the claimed invention. A "consisting essentially of" claim thus occupies a middle ground between closed claims that are written in a "consisting of" format, and fully open claims that are drafted in a "comprising" format. Optional additives as defined herein, at a level that is appropriate for such additives, and minor impurities are not excluded from a composition by the term "consisting essentially of".

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "predominant portion", as used herein, unless otherwise defined herein, means that greater than 50% of the referenced material. If not specified, the percent is on a molar basis when reference is made to a molecule (such as hydrogen, methane, carbon dioxide, carbon monoxide and hydrogen sulfide), and otherwise is on a weight basis (such as for carbon content).

The term "substantial portion" or "substantially", as used herein, unless otherwise defined, means all or almost all or the vast majority, as would be understood by a person of ordinary skill in the relevant art in the context used. It is intended to take into account some reasonable variance from 100% that would ordinarily occur in industrial-scale or commercial-scale situations.

The term "depleted" or "reduced" is synonymous with reduced from originally present. For example, removing a substantial portion of a material from a stream would produce a material-depleted stream that is substantially depleted of that material. Conversely, the term "enriched" or "increased" is synonymous with greater than originally present.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising vinyl acetate and 15 mol % of a comonomer", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

As ascertainable from the context, the term "composition" will typically be used to refer to more than one polymer and/or copolymer together, and optionally other types of components blended or admixed therewith, but can permissibly also be used to refer to just one polymer or copolymer by itself.

The term "unit" refers to a unit operation. When more than one "unit" is described as being present, those units are operated in a parallel fashion unless otherwise stated. A single "unit", however, may comprise more than one of the units in series, or in parallel, depending on the context. For example, a thermal treating unit may comprise a first cooling unit followed in series by a second cooling unit.

The term "free-flowing" particles (or agglomerates) as used herein means that the particles do not materially further agglomerate (for example, do not materially further aggregate, cake or clump), as is well understood by those of ordinary skill in the relevant art. Free-flowing particles need not be "dry" but, desirably, the moisture content of the particles is substantially internally contained so that there is minimal (or no) surface moisture.

The term "D(X) particle size" means the diameter at which X % of the sample's mass is comprised of particles with a diameter less than this value. For example, "D(10) particle size" means the diameter at which 10% of the sample's mass is comprised of particles with a diameter less than this value, and "D(90) particle size" means the diameter at which 90% of the sample's mass is comprised of particles with a diameter less than this value.

Mesh sizes of wire screens set forth herein for use in size classification operations are taken from the American Standard Sieve Series (Standard Specification for Woven Wire Test Sieve Cloth and Test Sieves) according to ASTM Standard Ell (2020 version). The sizes of the particles that make up a particulate composition, and thus the particle size distribution thereof, can be determined by processing the composition through a nested set of vibrating sieves, each sieve having a tray floor that is a different mesh size screen, and that is smaller than the screen immediately above it. After all material has fallen through the set of sieves and is either retained on a sieve or has fallen to the bottom collection pan, the weight fraction of the starting composition can be determined for each mesh size by weighing the amount of material that is retained on that screen having such mesh size, thus determining a size gradation for the particles of the composition. The mass of the sample on each sieve is then divided by the total mass to give a percentage of the total retained on each sieve, and which fraction is thus classified by the size of the mesh opening on that screen. In either case, a particle size distribution for the particular polyvinyl alcohol composition source or batch may thus be determined.

When the size of a particle herein is described, for example, as "X mesh size or larger", this means that the particle would not pass through the screen opening for that specifically named mesh size, not that mesh sizes tied to a larger number are also being in that particular instance referred to. Similarly, when the size of a particle herein is described, for example, as "smaller than X mesh size", this means that the particle would pass through the screen opening for that specifically named mesh size, not that mesh sizes tied to a smaller number are also being in that instance referred to.

The term "substantially soluble in water" and "soluble in water" means substantially completely (or completely) soluble in deionized water under the stated conditions.

The term "substantially soluble in brine" and "soluble in brine" means substantially completely (or completely) soluble in brine (i.e. a water solution with NaCl concentration of up to 2.9 wt %) under the stated conditions.

The term "acid-soluble weighting agent" means a material that is soluble in an acidic medium, or reacts in acidic medium to result in a product that is soluble in water. For example, calcium carbonate reacts in an acidic medium to generate calcium salt that is soluble in water.

For convenience, many elements of this invention are discussed separately, lists of options may be provided and numerical values may be in ranges; however, for the purposes of the present disclosure, that should not be considered as a limitation on the scope of the disclosure or support of the present disclosure for any claim of any combination of any such separate components, list items or ranges. Unless stated otherwise, each and every combination possible with the present disclosure should be considered as explicitly disclosed for all purposes.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

Polyvinyl Alcohol Component

The polyvinyl alcohol component used in the present invention generally comprises one or more polyvinyl alcohol polymers, and one or more plasticizers.

In one embodiment, the polyvinyl alcohol component comprises one or more acid-functional polyvinyl alcohol polymers, or mixtures thereof with one or more other types of polyvinyl alcohol polymers. Acid-functional polyvinyl alcohol polymers can generally be hydrolyzed copolymers of vinyl acetate with one or more acid-functional comonomers, and/or polyvinyl alcohol homopolymers and copolymers that have been modified to impart acid functionality.

Further details are provided below.

Polyvinyl Alcohol Polymers

One of the polymers used in the manufacture of the compositions of this invention is vinyl alcohol based. The compositions hereof can contain polyvinyl alcohol homopolymers and/or copolymers, both of which are in a general sense well-known polymers and are generally commercially available in many forms for a variety of end-uses. A typical polyvinyl alcohol suitable for use herein is described in, for example, previously incorporated WO2018/231236A1, WO2019/031613A1, US2020/0071592A1, US2020/0071597A1, US2020/0071599A1, US2020/0071605A1, U.S. Provisional Appln. Ser. No. 62/967,956 (filed 30 Jan. 2020), U.S. Provisional Appln. Ser. No. 62/967,940 (filed 30 Jan. 2020), and U.S. Provisional Appln. Ser. No. 62/982,199 (filed 27 Feb. 2020), as well as US2017/0260309A1, US2019/0055326A1, U.S. Pat. Nos. 2,734,048, 3,497,487, 3,654,247 and 4,119,604.

Polyvinyl alcohol is produced on a commercial scale by polymerizing a vinyl ester to generate a polyvinyl ester, after which the ester groups are hydrolyzed to hydroxyl groups in varying degrees. Examples of vinyl esters suitable for use herein as a starting material include vinyl acetate, vinyl propionate, vinyl benzoate, vinyl stearate, vinyl versatate, vinyl pivalate, vinyl formate, vinyl valerate, vinyl caprinate, vinyl laurate, and vinyl carboxylate copolymers, such as ethylene-vinyl acetate copolymer. For reasons of economy, availability and performance, vinyl acetate is preferred. Several different hydrolysis methods, as described below, are well known and can be used for the purpose of completing the conversion to —OH groups of the pendant ester groups in the polymer formed from whatever vinyl ester is chosen as the beginning reactant.

A polyvinyl acetate intermediate, which is the most frequent choice, can be produced by the free radical polymerization of a vinyl acetate monomer in the presence of a polymerization catalyst. The solvent commonly used in the commercial polymerization of vinyl acetate is a hydrolytic alcohol such as methanol, ethanol, the propanols or the monomethyl ether of ethylene glycol. Methanol is preferred. The polymerization is typically conducted in the temperature range of from about 10° C. to about 80° C. The lower end of the polymerization range is known to give products with improved properties. The percent conversion of vinyl acetate to polyvinyl acetate can vary over a wide range. Though conversions ranging from about 20% to 100% have been found satisfactory, commercially at least about 30% conversion is preferable.

The viscosity-average degree of polymerization in the polymer can be adjusted by adjusting variables such as the residence time in the polymerization reaction vessels, the monomer feed rate, the solvent concentration, the initiator concentration and the polymerization temperature. Increasing the residence time in the polymerization reaction vessels, the monomer feed rate, the initiator concentration and the polymerization temperature, and reducing the solvent concentration, will tend to increase the degree of polymerization in the copolymer.

When a vinyl alcohol copolymer is prepared, one or more comonomers may be included in the reaction by which the beginning vinyl ester reactant is polymerized. Without the presence of the comonomers, a PVOH homopolymer would be obtained. The comonomer(s) provided along with the beginning vinyl ester are incorporated into the polymer chain, and remain intact after hydrolysis of the pendant ester groups to —OH groups.

In one embodiment, the compositions hereof are based on the presence an acid-functional polyvinyl alcohol homopolymer and/or copolymer.

One means of imparting acid functionality is to incorporate one or more "acid functional" comonomers, which are available for use as comonomers in a PVOH copolymer. Such acid-functional comonomers include, for example, one or more of (i) a monocarboxylic unsaturated acid, (ii) a dicarboxylic unsaturated acid, (iii) an alkyl ester of (i), (iv) an alkyl ester of (ii), (v) an alkali metal salt of (i), (vi) an alkali metal salt of (ii), (vii) an alkaline earth metal salt of (i), (viii) an alkaline earth metal salt of (ii), (ix) an anhydride of (i), and (x) an anhydride of (ii).

Particular examples of such acid-functional comonomers include methacrylic acid, methyl methacrylate, 2-hydroxyethyl acrylate, hydroxyl methacrylate, ethyl methacrylate, n-butyl methacrylate, maleic acid, monomethyl maleate, dimethyl maleate, maleic anhydride, itaconic acid, monomethyl itaconate, dimethyl itaconate, itaconic anhydride, neodecanoic acid, and vinyl neodecanoate. Preferred are lower alkyl ($C_2$-$C_8$, or $C_2$-$C_4$) acrylates and methacrylates. Non-limiting examples of such comonomers include methyl acrylate, methyl methacrylate, ethyl acrylate, ethyl methyacrylate, i-propyl acrylate, i-propyl methacrylate, n-propyl acrylate, n-propyl methacrylate, i-butyl acrylate, i-butyl methacrylate, n-butyl acrylate, n-butyl methacrylate, t-butyl acrylate, t-butyl methacrylate, ethylhexyl acrylate, ethylhexyl methacrylate and others. Preferred comonomers also include methyl acrylate, methyl methacylate and mixtures thereof, and particularly methyl acrylate. Examples of commercially available polyvinyl alcohols containing acid-functional comonomers include those available under the trade designation Kuraray POVAL™ K-series grades such as 32-97KL, 25-88KL, 6-77KL and 30-94KL (Kuraray Co., Ltd., Tokyo, Japan), or ELVANOL™ 80-18 (Kuraray America, Inc., Houston, Texas USA).

Other comonomers can be used to impart hydrophobicity to the polyvinyl alcohol. One such commoner is an olefinic monomer, which is typically defined as including unsaturated hydrocarbons that contain one or more double or triple bonds, and are sometimes alternatively referred to as ethylenic or ethylenically unsaturated monomers. Generally, the purpose of the presence of the olefinic comonomer(s) in the vinyl alcohol copolymers is to impart a degree of hydrophobicity to the vinyl alcohol copolymer. Unsaturated monomers containing atoms other than hydrogen and carbon but that nevertheless impart hydrophobicity will also be included in the term "olefinic monomer" as used herein.

Particular examples of suitable olefinic comonomers for use herein (whether straight chain, cyclic, aromatic, or optionally branched) include without limitation ethylene, propylene, $C_4$-$C_{20}$ α-olefins, $C_4$-$C_{20}$ internal olefins, $C_4$-$C_{20}$ vinylidene olefins, $C_5$-$C_{20}$ cyclic olefins, $C_8$-$C_{20}$ aromatic olefins, and $C_4$-$C_2$ dienes, as well as $C_4$-$C_{20}$ functionalized olefins, including derivatives of any of the foregoing containing hetero atoms such as O, S or N. Any of the $C_4$-$C_{20}$ compounds listed in the preceding sentence may instead be a $C_4$-$C_{12}$ or a $C_4$-$C_8$ compound as desired. Examples of suitable olefinic monomers include without limitation ethylene, propylene, 1-butene, 1-pentene, 1-hexene, 4-methyl-pent-1-ene, 1-heptene, 1-hexene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecyl, 1-eicosene, 2-butene, 4-methyl-1-pentene, ethyl-1-hexene, cyclohexene, norbornene, styrene, methyl styrene, allyl stearate, vinyl stearate, butadiene, mixtures thereof and the like. Preferred are ethylene and $C_3$-$C_8$ α-olefins; more preferred is ethylene.

As noted above, other types of monomers containing hetero atoms are available for use when desired to impart hydrophobicity to a vinyl alcohol polymer, particularly when in admixture with a true hydrocarbon such as ethylene. Examples of such other types of monomers include acrylics, amides and imides, carbonates, esters, ethers, fluorocarbons, vinyl acetals, vinyl and vinylidene chlorides, vinyl esters, vinyl ethers and ketones, propylene oxide, vinylpyridine and vinypyrrolidone.

In addition, combinations of an acid-functional comonomer (as described below) and another comonomer can also be used.

The content of a comonomer in a polyvinyl ester (such as a polyvinyl acetate), and thus in the resulting polyvinyl alcohol copolymer prepared therefrom, can be at least about 0.1 mol %, or at least about 0.5 mol %, or at least about 1 mol %, and yet not more than about 15 mol %, or not more than about 10 mol %, or not more than about 8 mol %.

Also included as polyvinyl alcohol polymers to which this invention applies are compositions in which one or more —OH groups on a polymer chain has participated in a reaction to form a derivatized polymer. For example, the —OH groups can form inorganic esters such as when they react with boric acid, borates, lactates, sulfates, vanadyl compounds and/or substituted derivatives thereof, and mixtures of any two or more of the foregoing. Polyvinyl alcohol can also undergo Michaels addition with compounds containing activated double bonds, including for example acrylonitrile, acrylamide and vinyl aldehydes and ketones, including in each case substituted derivatives of, and mixtures of, the named reactants.

In other embodiments, the —OH group of a polyvinyl alcohol can form organic compounds such as the formation of an ester from a carboxylic acid or anhydride (e.g. acrylic or methacrylic acid, or maleic anhydride); the formation of a carbonate from a chloroformate; and the formation of a carbamate from a urea or isocyanate; including in each case substituted derivatives of, and mixtures of, the named reactants. Polyvinyl alcohol can also form an internal ether from the elimination of water, and can form an external ether from a reaction with a $C_2$ or higher, chloro-substituted carboxylic acid or ester thereof, including in each case substituted derivatives of, and mixtures of, the named reactants. Polyvinyl alcohols can also be crosslinked in a reaction with a multifunctional compound such as glyoxal, glutaraldehyde, urea-formaldehyde, melamine-formaldehyde, trimethylolmelamine sodium borate or boric acid, and isocyanates.

In addition to the above modifications of a polyvinyl alcohol polymer, another method for controlling the solubility (and dissolution time) of a particulate composition hereof is by blending a first polyvinyl polymer, such as polyvinyl alcohol copolymer, with one or more second fully- or partially-hydrolyzed polyvinyl alcohol homopolymers and/or copolymers. Such other polyvinyl alcohols may be chosen to be more soluble than the first polyvinyl alcohol polymer, but typically they are chosen to be less soluble and thus extend the dissolution rate of the compositions comprising the combination.

In one embodiment, a polyvinyl alcohol component hereof comprises a blend of an acid-functional polyvinyl alcohol and another polyvinyl alcohol, wherein the acid-functional polyvinyl alcohol is present in the blend in an amount of from about 10 wt %, or from about 20 wt %, or from about 25 wt %, or from about 33 wt %, or from about 40 wt %, to about 90 wt %, or to about 80 wt %, or to about 77 wt %, or to about 67 wt %, or to about 60 wt %, based on the total weight of all polyvinyl alcohol components. In such embodiment, a second polymer is another polyvinyl alcohol that can, for example, be one or more partially- or fully-hydrolyzed polyvinyl alcohol homopolymers. Such polyvinyl alcohol homopolymers are generally commercially available, for example under the brands KURARAY POVAL™ and ELVANOL™ from Kuraray Co., Ltd. (Tokyo, Japan) and its affiliates, and are present in the blend in an amount that makes up the balance of the composition wherein the content of the polyvinyl alcohol polymers totals to 100 wt %.

In another embodiment hereof, the polyvinyl alcohol polymer is a transition product produced in a continuous hydrolysis process. Such transition product is in essence an intimate reactor blend of multiple polyvinyl alcohol grades as would be recognized by one of ordinary skill in the relevant art.

For example, in many commercial continuous polyvinyl alcohol hydrolysis processes, instead of completely stopping the process and cleaning the equipment, the polyvinyl acetate feed is transitioned and/or the reaction conditions are transitioned from grade to grade. At some point, the process starts producing one grade of specified properties then transitions over time to a second grade of specified properties. This interim production is referred to as a transition grade.

In one embodiment, this transition grade is produced by transitioning production of a polyvinyl alcohol copolymer to production of a polyvinyl alcohol homopolymer (or vice versa). In this case, the polyvinyl alcohol homopolymer is less soluble than the polyvinyl alcohol copolymer so that the dissolution rate of the particulate composition can be modified.

In another embodiment, the transition grade is produced by altering the hydrolysis conditions, for example, thermal treatment step and/or level of excess catalyst neutralization, which can result in different solubility polyvinyl alcohols from the same starting polyvinyl acetate.

In another embodiment, the transition grade is produced by transitioning both the starting polyvinyl acetate and the hydrolysis conditions (for example, thermal treatment step and/or level of excess catalyst neutralization).

While the exact composition of the transition grade varies as a function of time, when different polyvinyl starting materials are used the average composition should fall within the blend proportions as described above.

A polyvinyl ester such as a polyvinyl acetate is converted to polyvinyl alcohol via hydrolysis, or alcoholysis, processes, as well known in the art. In such processes, the polyvinyl acetate is contacted with an alkali catalyst such as sodium hydroxide or sodium methylate. The major products of this reaction are polyvinyl alcohol and methyl acetate. Regardless of the hydrolysis process, the resulting polyvinyl alcohols would be expected to have substantially the same monomer makeup and degree of polymerization as the starting polyvinyl acetates.

The solubility of polyvinyl alcohol is influenced by the degree of hydrolysis (i.e. the presence of hydroxyl groups along the polymer chain). As the smaller hydroxyl groups are substituted for the bulkier ester (e.g. acetate) groups along the chain, the opportunity for close packing of the polymeric molecules, for increased interchain attraction between them, and for the tendency to form crystallites, is correspondingly increased. The more closely packed the chains are, the more difficult it is to dissolve polyvinyl alcohol in water.

In general, the degree of hydrolysis can be increased by increasing catalyst concentration; and/or by decreasing the rate of flow of an alcoholysis mixture through the reaction vessels and subsequent processing steps. A higher rate of hydrolysis is also favored by higher temperature, higher concentration of catalyst and lower concentration of acetate byproduct in the alcoholysis reactor, or corresponding conditions in a belt reactor.

In general, the alcoholysis catalyst can be any of the alkaline catalysts such as the alkali metal hydroxides and the alkali metal alcoholates. The alcoholate catalysts, particularly sodium methylate, are especially preferred. The catalyst concentration in the alcoholysis mixture may range from about 0.05%, or from about 0.1%, to about 5%, or to about 1%, by weight of the alcoholysis mixture. Higher catalyst concentrations will tend to increase the degree of hydrolysis. The solvent in the reaction, typically a hydrolytic alcohol, such as methanol, may suitably constitute from about 20, or from about 30, to about 70% of the weight of the alcoholysis reaction mixture. The alcoholysis reaction is typically conducted at a temperature in the range of from about 20° C., or from about 40° C., to about 100° C., or to about 65° C. Higher temperatures are preferred with sodium methylate is used as the catalyst, but lower temperatures are suitable for use when NaOH is used as the catalyst. As it progresses, the alcoholysis reaction can, if desired, be quenched with an acid such as acetic acid.

The degree of crystallinity of polyvinyl alcohol polymers or copolymers can be increased by orientation or annealing. Heating of polyvinyl alcohol at elevated temperatures near its crystalline melting point (about 220° C. to about 230° C.), and cooling slowly, also increases the degree of crystallinity.

In one embodiment of this invention, a polyvinyl alcohol can be prepared by a bulk, solution, suspension, dispersion or emulsion process. In such processes, a polyvinyl alcohol in a gel-like form, which is resistant to dissolving (or "sliming") in water, can be prepared by vigorously mixing alcoholic solutions of a polyvinyl ester and alkali in a mixing chamber such as a tank reactor. The PVOH product is removed from the reactor intact for further processing during which it continues to undergo gelation.

Generally in this type of process, polyvinyl acetate dissolved in methanol is treated with a strongly basic catalyst such as sodium methoxide, and methanolysis commences immediately forming vinyl alcohol units in the polymer and methyl acetate as a byproduct. In general, the alcoholysis reaction will be effected with the hydrolytic alcohol at temperatures ranging from about 20° C., or from about 40° C., to about 100° C., or to about 65° C., and the alcohol is most typically methanol, as noted, but can be other lower alkanols such as ethanol if desired. The pressure should, of course, be sufficient to maintain liquid-phase conditions at the desired temperature for the reaction, and pressures from atmospheric to two or more atmospheres of pressure or higher can be used. The hydrolytic alcohol should be substantially anhydrous, by which is meant that the alcohol will contain not more than about 1 wt % water, and preferably not more than 0.2 wt % water.

The alcohol content of the alcoholysis mixture should be such as to provide a suitable excess of the alcohol. Most generally, the alcohol used will be the alcohol employed for dissolving the ester in the production of the intermediate vinyl ester polymer which is to be alcoholyzed. It will generally constitute from around 40 to 90 percent, preferably 50 to 70 percent, of the weight of the alcoholysis reaction mixture. Conversely, the solids content will generally be 10 to 60 percent, preferably 30 to 50 percent, of the reaction mixture. The by-product of the alcoholysis reaction will be methyl acetate. Such ester can be removed as formed during the alcoholysis or allowed to build up in the alcoholysis medium.

The alcoholysis catalyst can be any of the alkaline catalysts that are effective in catalyzing the alcoholysis such as the alkali metal hydroxides and the alkali metal alcoholates. The alcoholate catalysts, particularly sodium methylate, are especially preferred. The catalyst concentration in the alcoholysis mixture may range from around 0.05 to 5 percent by weight, but preferably will be about 0.1 to 1 percent, of the weight of the alcoholysis mixture.

Instead of a tank reactor as mentioned above, other types of reactors may also be used when preparing a reaction mixture that will be deposited in, on or onto a receptacle (as described below), including without limitation a line mixer, a kneader type mixer, a piston-flow type reactor, a tube type reactors, and a tower type reactor. Examples of suitable tower type reactors include packed towers, perforated plate towers, and plate towers, such as bubble-cap towers. Alternatively, a heat-exchanging type reactor may be suitable for use herein, examples thereof including falling film evaporators, such as plate-fin type evaporators, wetted-wall towers, thin film evaporators, and shell and tube evaporators.

Regardless of the type of reaction device used, little to no change in the appearance of the solution is observed; during the initial portion of this type of reaction. However, as the degree of alcoholysis approaches 40 to 50 percent, the viscosity begins to rise rapidly, and the solution gels. Heavy-duty mixing equipment would ordinarily be required to maintain good mixing, and then, as the alcoholysis proceeds further, to break down the gel into discrete particles. In this type of process, however, continuous processing of a so-called "plug flow" nature is employed such that all increments of the total mixture have essentially the same holdup time, or residence time, in the alcoholysis reaction zone because, as gelation ensues, the reaction mixture is spread out quickly as a film on a moving belt or rotating drum. The reaction mixture deposited in, on or onto the receptacle or carrier forms a body undergoing gelation, and at the point before a significant amount of syneresis has taken place, the body is removed from the belt or drum, and is passed into a granulator, or other apparatus for cutting, comminuting or chopping the gel in any required manner.

Granulating a body undergoing gelation that is formed from a polyvinyl alcohol (co)polymer, or blend thereof with other polymers, provides PVOH granules that are relatively compact and regular in shape. Using a knife or other suitable cutting device, the body may be granulated wherein the granulator can be adjusted to provide a batch of granules at least about 90 wt %, or at least about 95 wt %, or at least about 98 wt %, or at least about 99 wt % of which have a size that is 35 mesh or larger, or 25 mesh or larger, or 18 mesh or larger, or 14 mesh or larger.

In other embodiments, the granulator can be adjusted to provide a batch of granules at least about 90 wt %, or at least about 95 wt %, or at least about 98 wt %, or at least about 99 wt % of which have a size and shape wherein such granules fit within the volume defined by a right cuboid (a rectangular cuboid) having a length that is at least about 2 mm or more, or at least about 3 mm or more, or at least about 4 mm or more, and yet is about 10 mm or less, or about 8 mm or less, or about 6 mm or less; a width that is at least about 1 mm or more, or at least about 2 mm or more, or at least about 3 mm or more, and yet is about 8 mm or less, or about 7 mm or less, or about 6 mm or less; and a height that is at least about 0.5 mm or more, or at least about 0.75 mm or more, or at least about 1 mm or more, and yet is about 2 mm or less, or about 1.5 mm or less, or about 1.25 mm or less. A right cuboid (a rectangular cuboid) in this context is one in which each of the faces is a rectangle and so each pair of adjacent faces meets in a right angle. In the above description of dimensions, the cuboid is considered as being viewed from above where the length is the longest dimension, the height is the shortest dimension, and the value of the width is between the values of the other two dimensions. In the view of the cuboid from above, the length and width form a rectangle, and the height dimension is perpendicular to the plane of the rectangle formed by the length and width, and represents the depth or thickness of such rectangle.

If desired, the granules obtained by granulating a body undergoing gelation can be dried to reduce the content of a monohydric alcohol therein to less than about 5 wt %, or less than about 3 wt %, or less than about 2 wt %, or less than about 1 wt %, or less than about 0.5 wt %. For such purpose, contact dryers, shovel dryers, disk dryers and fluidized bed dryers are all suitable as apparatus in which thermal drying can be carried out. Suitable commercial brands of dryers include for example Bepex® dryers and Nara® dryers. Drying can also take place in the granulator itself, by heating the shell or blowing warm air into it. It is similarly possible to use a downstream dryer, for example a tray dryer, a rotary tube oven, a centrifuge, or a heatable screw. Preferred drying temperatures range from about 50° C. to about 250° C., or to about 200° C., or to about 150° C. The preferred residence time at such a temperature is less than about 30 minutes, or less than about 10 minutes. However, drying will frequently leave at least a trace or negligible amount of monohydric alcohol in the polymer.

Processes for making polyvinyl alcohol granules from a body undergoing gelation are more fully described in previously incorporated U.S. Provisional Appln. Ser. No. 62/967,956 (filed 30 Jan. 2020).

Another process for obtaining vinyl alcohol polymers is the slurry process. In one embodiment of a slurry alcoholysis process, a first solution of typically about 30 wt % to about 60 wt % polyvinyl acetate copolymer in methanol, and a second solution of dilute sodium methylate alcoholysis catalyst in methanol, are continuously fed to an alcoholysis unit wherein the reaction proceeds to produce a first slurry of the alcoholyzed polyvinyl acetate (polyvinyl alcohol) and methyl acetate. Catalyst amount typically ranges from about 0.2 wt % to about 0.5 wt % based on the weight of the reaction mixture. The temperature of the alcoholysis reaction in the alcoholysis unit is typically from about 58° C., or from about 64° C., to about 70° C., or to about 68° C. The pressure within the alcoholysis unit ranges from slightly below atmospheric pressure to slightly above atmospheric pressure, but is typically slightly above atmospheric pressure. The alcoholysis unit contains an agitation means so that the alcoholysis is at least partially conducted under agitation conditions.

When the alcoholysis reaches about 40-50%, the polymer partially precipitates. The insoluble material takes the form of a gel of polymer molecules solvated with methanol. As the solubility decreases by further alcoholysis, the gel becomes tougher and begins to reject the associated solvent molecules. When the alcoholysis is completed, the polymer and solvent are mutually insoluble. If this gel is allowed to stand undisturbed, alcoholysis proceeds and the product is obtained in a massive, unworkable form. However, if the gel is worked mechanically (agitated) during this range above about 40% alcoholysis, the polymer will break down to finely-divided solids insoluble in the alcohol. The collapsing gel traps and sticks together with the fine particles from the previous alcoholysis cycle producing polyvinyl alcohol of a desired "popcorn ball" morphology.

In another embodiment, the alcoholysis unit is made up of a primary alcoholysis vessel where the reaction proceeds to produce a slurry of partially alcoholyzed polyvinyl acetate. The slurry from the primary alcoholysis vessel overflows, typically continuously, to an agitated hold vessel which provides additional residence time for completing the alcoholysis reaction. The slurry from the agitated hold vessel is then pumped through one or more finisher units to react short-circuited polyvinyl acetate, thus ensuring that the conversion is raised to 99.5% or higher of desired completion. Preferred amount of conversion of a polyvinyl acetate starting material is measured as a degree of hydrolysis.

The resulting first polyvinyl alcohol slurry may then optionally be fed to a neutralizing unit along with an acid to fully or partially neutralize remaining alcoholysis catalyst. In one embodiment, the catalyst is substantially neutralized. In another embodiment, less than a predominant portion (less than 50 equivalent %), or less than 25 equivalent %, or less than 10 equivalent %, or less than 5 equivalent %, of any excess alkali catalyst, can be neutralized. Typically, the acid employed is acetic acid. A second slurry is generated from the neutralizing unit. If present, the neutralizing unit can also be used to control the pH of the resulting second slurry. In an alternative embodiment, the neutralizing unit is not present (or is bypassed if present, or is present with substantially no acid feed, or is present with no acid feed), and the excess alkali catalyst is substantially not neutralized (or not neutralized) and remains in first slurry.

In one embodiment, the polyvinyl alcohol polymer is a non-neutralized polyvinyl alcohol polymer, for example, a non-neutralized acid-functional polyvinyl alcohol copolymer, such as a copolymer of vinyl acetate with one or more lower alkyl acrylate ester monomers as disclosed in previously incorporated WO2019/035946A1.

In yet another embodiment, the second slurry resulting from the neutralization unit, if present, or if not present the first slurry, is then fed to an optional thermal treating unit. The temperature of the first slurry, or the second slurry if present, may be elevated or reduced in the thermal treating unit depending on the desired solubility of the resulting polyvinyl alcohol copolymer. If higher solubility is desired, the temperature can be reduced to less than 50° C., or to less than 40° C., or to less than 35° C., or to less than 30° C., or to less than 25° C., or to less than ambient conditions, with the lower temperatures resulting in higher amorphous and less crystalline content. The thermal treatment unit can be a holding tank with mild heating, or no heating or even active cooling so that the temperature of the slurry is increased or reduced between entry and exit. In one embodiment, the thermal treating unit is not present.

In yet another embodiment, the slurry is fed to a solids-liquid separation unit where polyvinyl alcohol is separated from the slurry to generate a polyvinyl alcohol wet cake and separated liquids. The solids-liquid separation unit can be a centrifuge and/or filtration device or other conventional solids-liquid separation device. In an alternate embodiment, the thermal treatment unit and solids-liquid separation unit can be combined in a single unit operation where the residence time of the slurry and solids is sufficient to reduce the temperature of the second slurry to the desired level.

In another embodiment, the process further comprises the step of washing the polyvinyl alcohol wet cake to produce a purified polyvinyl alcohol wet cake, which is then subject to the drying step. The resulting polyvinyl alcohol wet cake can optionally be purified by feeding the wet cake into a washing unit where it is contacted typically with a fresh or recycled methanol stream to remove ash components and other contaminates to generate a purified polyvinyl alcohol wet cake. In order to generate the final particulate agglomerated polyvinyl alcohol particles, the purified polyvinyl alcohol wet cake after centrifugation, or the wet cake if the washing unit is not present or not utilized, is fed to a drying unit where it is dried via conventional means to remove sufficient remaining liquid content so that the resulting particulate agglomerated polyvinyl alcohol copolymer particles can be recovered, preferably as a free-flowing powder.

Additional process details can be had by reference to previously incorporated US2017/0260309A1 and US2019/0055326A1, as well as U.S. Pat. No. 2,734,048, 3,497,487, 3,654,247 and general knowledge of those of ordinary skill in the relevant art.

In yet another embodiment, a polyvinyl alcohol may be prepared in a single or twin screw extruder by the alcoholysis of a polyvinyl ester in the presence of a basic catalyst and in the presence of an alkanol as solvent. The alcoholysis of the polyvinyl ester is carried out in the presence of a lower alkanol, preferably an alkanol having 1, 2 or 3 carbon atoms, such as methanol, ethanol, propanol and isopropanol. The alkanol is used in an amount of from about 10 wt %, or from about 20 wt %, to about 50 wt %, or to about 40 wt % (relative to the polyvinyl ester). This alcoholysis process is carried out in the presence of a basic catalyst such as an alkali metal hydroxide or alkali metal alcoholate as the catalyst including, for example, sodium hydroxide, potassium hydroxide, sodium methylate, ethylate and propylate as well as potassium methylate, ethylate and propylate. The amount of the catalyst is usually from about 1 wt %, or from about 6 wt %, to about 10 wt %, or to 9 about wt % (relative to the polyvinyl ester). The concentration of the catalyst solution is appropriately within the range from about 10 wt %, or from about 12 wt %, to about 25 wt %, or to 20 about wt %.

Depending on the type and quantity of the polyvinyl ester, a period of 1 to 5 minutes is required for the trans-esterification reaction. Finally, the polyvinyl alcohol obtained after the trans-esterification reaction is cooled to a temperature of from about 20° C. to about 40° C., then neutralized, washed and dried in the customary manner. The neutralization can be effected by means of a weak inorganic, or preferably organic, acid, for example phosphoric acid or acetic acid. After being neutralized, the polyvinyl alcohol is washed with a lower alkanol of the type mentioned above. The final drying is carried out at a temperature of from about 70° C. to about 175° C., preferably under an inert gas, for example nitrogen. The polyvinyl alcohol product is obtained in the form of a crumbly particulate material which is distinguished by good flow properties. The average particle diameter of the PVOH product of obtained in this manner is usually within the range of from about 0.1 mm, or from about 0.3 mm, to about 1.5 mm, or to about 0.8 mm.

Instead of removing the PVOH product from the extruder for washing and drying, however, a plasticizer (as described below) can be injected to a downstream zone of the extruder, which permits the product to behave as a thermoplastic as it passes through that zone and enables it to be extruded as a strand that can be pelletized. Since PVOH in the unplasticized state has a high degree of crystallinity and shows little or no thermoplasticity before the occurrence of decomposition which starts at about 170° C. (and becomes pronounced at 200° C.), the use of a plasticizer is essential if there is a desire to obtain the PVOH product in the form of a pelletized strand. The same effect can be achieved by removing the product from the reaction extruder and passing it to a second extruder together with a plasticizer for pelletization, and this permits the added option of washing and drying before feeding to the second extruder.

The polyvinyl alcohol pellets can be made into any desired shaped depending on the extrusion die (cylindrical, oval, rectangular, star etc.), but typically they are substantially cylindrical in shape The preferred length of the pellets is from about 2 mm, or from about 3 mm, to about 5 mm, or to about 4 mm. The diameter of the pellets is from about 1.2 mm, or from about 2 mm, to about 5 mm, or to about 4 mm. If the pellet is not cylindrical, then the diameter should be taken as the widest part of the pellet.

The use of extruders in processes for making polyvinyl alcohol polymers is further discussed in, for example, U.S. Pat. Nos. 4,338,405, 4,401,790 and US2020/0071592A1.

The polyvinyl alcohol polymers used in this invention desirably and preferably have the following properties.

Preferred amount of conversion of a polyvinyl ester (e.g. polyvinyl acetate) intermediate material to PVOH is measured as a degree of hydrolysis. The polyvinyl alcohol resin should have a degree of hydrolysis of from about 60 mol %, or from about 65 mol %, or from 70 mol %, or from about 75 mol %, or from about 85 mol %, or from about 90 mol %, or from about 93 mol %, or from about 95 mol %, or from about 98 mol %, or from about 99 mol %, to 100 mol % (maximum). In one specific embodiment, the degree of hydrolysis is in the range of from about 60 mol % to 100 mol %. In another specific embodiment, the degree of hydrolysis is in the range of from about 65 mol % to about 90 mol %. The degree of hydrolysis can be measured in accordance with JIS K6726 (1994).

Preferred volatile components and/or volatile impurities should be present in the polyvinyl alcohol polymer in amount of less than about 2 wt %, or less than about 1.5 wt %, or less than about 1 wt %, based on the total weight of the polyvinyl alcohol resin.

Preferred water content of the polyvinyl alcohol polymer should be less than 2 about wt % (determined according DIN 51777, method of Karl-Fischer).

Preferred methanol content of the polyvinyl alcohol polymer should be less than about 2 wt %, or less than about 1.5 wt %, or less than about 1 wt %, based on the total weight of the polyvinyl alcohol resin.

In general, a polyvinyl ester (such as a polyvinyl acetate), and thus of the resulting polyvinyl alcohol prepared therefrom, can have a weight average molecular weight in the range of at least about 3000, or at least about 20000, or at least about 50000, and yet not more than about 180000, or not more than about 130000, or not more than about 80000.

The viscosity-average degree of polymerization of a polyvinyl ester (such as a polyvinyl acetate), and thus of the resulting polyvinyl alcohol prepared therefrom, can be in the range of at least about 200, or at least about 500, or at least about 1500, and yet not more than about 5000, or not more than about 3750, or not more than about 2250. The viscosity-average degree of polymerization of a polyvinyl alcohol polymer is measured in accordance with JIS K6726 (1994).

In one embodiment, the polyvinyl alcohol polymers (a) can have a degree of solubility in deionized water at a temperature in the range of about 50° C. to about 70° C. of at least about 3 wt %, or at least about 6 wt %, or at least about 12 wt %, and yet not more than about 30 wt %, or not more than about 25 wt %, or not more than about 20 wt %; and (b) can have a degree of solubility in deionized water at a temperature in the range of about 90° C. to about 110° C. of at least about 75 wt %, or at least about 80 wt %, or at least about 85 wt %, up to about 100 wt %, or not more than about 99 wt %, or not more than about 98 wt %.

The polyvinyl alcohol polymers hereof can have a degree of crystallinity of at least about 0.2, or at least about 0.25, or at least about 0.35, and yet not more than about 0.55, or not more than about 0.5, or not more than about 0.4. Degree of crystallinity can be measured according to differential scanning calorimetry (DSC), which is a method of measuring the flow of heat into or out of a material with respect to time or temperature, and can be measured by quantifying the heat associated with melting (fusion) of the polymer. The heat can be evaluated in terms of percent crystallinity by ratioing against a polymer of known crystallinity to obtain relative values, or by ratioing against the heat of fusion for a 100% crystalline polymer sample. DSC is frequently performed with a thermoelectric disk with raised platforms over which the reference (usually an empty pan) and a metal pan carrying a sample are placed. As heat is transferred through the disk, the differential heat flow to the sample and reference is monitored by area thermocouples. The sample temperature can be directly monitored by a sample thermocouple. The presence of a preheated purge gas further provides additional baseline stability in addition to the desired sample/atmosphere interaction. However, polymer crystallinity can also be measured using dilatometry, x-ray scattering, or polarized optical microscopy.

The polyvinyl alcohol copolymers can have an olefinic unit block character of about 0.90 to about 0.99, which indicates non-blockiness, i.e. substantial randomness. Unit block character, or the blockiness index, of a polymer can be calculated from the triad distribution, using the analysis outlined in Halverson, F. et al, *Macromolecules* 18 (6), 1985, 1139-1144. Results obtained according to this approach are usually categorized as follows: 100% block copolymers have a blockiness index value of about 0.0; 100% alternating copolymers have a blockiness index value of about 2.0; and ideally random copolymers have a blockiness index value of about 1.0.

Preferred viscosity of the polyvinyl alcohol polymers hereof, based on a solution of 4 wt % in water (20° C., DIN 53015), is in the range of from about 2 mPa·s, or from about 3 mPa·s, or from about 10 mPa·s, to about 125 mPa·s, or to about 70 mPa·s, or to about 40 mPa·s, or to about 30 mPa·s, or to about 15 mPa·s. The viscosity of a polyvinyl alcohol polymer hereof can be determined on a 4% aqueous solution at 20° C. determined by the Hoeppler falling ball method (ASTM-D 1343-56).

Plasticizers

The polyvinyl alcohol component of the present invention includes one or more plasticizers. The plasticizers can be added during the manufacture of the particulate polyvinyl alcohol particles, or added subsequently.

Plasticizers may be included in manufacturing of the compositions of this invention to improve the flow characteristics of the polyvinyl alcohol. In order to obtain a uniform plasticizer coating it is preferred to utilize a spray mechanism to coat the particles of the polymer(s) of the composition. A secondary effect of such plasticizers is to reduce any dusting issues with the particulate compositions, or during the preparation of the particulate compositions.

Materials commonly used as plasticizers for polyvinyl alcohols are generally known to those of ordinary skill in the relevant art, and are generally commercially available. Suitable plasticizers include, for example, compounds such as water, glycerol, polyglycerol, ethylene glycol, polyethylene glycols, ethanol acetamide, ethanol formamide, and acetates of triethanolamine, glycerin, trimethylolpropane and neopentyl glycol, and mixtures of two or more of the above. The preferred polyglycol used as an anti-dusting agent in this invention is polyethylene glycol having a molecular weight (Mn) of about 200 and 600 due to its superior dust suppressant properties after extreme temperature recycling.

Plasticizers that are solid or crystalline at ambient temperatures, such as trimethylolpropane, may be dissolved in water, or another liquid medium that will not offset the plasticization effect, for use as a sprayable plasticizer. Alternatively, however, a plasticizer can be mixed with the polyvinyl alcohol component(s) of a composition hereof when both are dissolved or dispersed in a liquid, or when both are in dry form. When a plasticizer is mixed with polyvinyl alcohol(s) in liquid, the resulting mixture will have to be dried to form a particle containing plasticized polyvinyl alcohol before other steps are taken, such as compaction of the dried mixture. When a polyvinyl alcohol composition containing a plasticizer is compacted, the plasticizer can be added to the composition before or after the compacting step. When a polyvinyl alcohol composition containing a plasticizer is compacted and the plasticizer is added to the composition after compaction into an object, and after granulation of the object, the plasticizer can be added before or after the step of granulation.

In one embodiment, the polyvinyl alcohol component contains sufficient plasticizer so that it is thermoplastic, for example, as disclosed in previously incorporated US2020/0071592A1.

Typically, the amount of plasticizer used can vary up to about 40 wt %, or up to about 30 wt %, or up to about 20 wt %, based on the combined weight of the polyvinyl alcohol polymer(s) plus plasticizer. In other embodiments, the amount of plasticizer used in the polyvinyl alcohol component can be in the range of about 0.5 wt %, or about 1 wt %, to about 15 wt %, or to about 10 wt %, or to about 6 wt %, or to about 4 wt %, combined weight of the polyvinyl alcohol polymer(s) plus plasticizer.

Fibers

As mentioned above, one of the components in a composition or kit as described herein is composed of fibers.

Fibers are a desirable component in any composition or kit that is used for the purpose of remediating a leaking subterranean well because they decrease the permeability of a loss zone by creating, in the flow path of a fracture, a porous mesh or web in, on or against which solid particles in the borehole fluids become lodged, thus forming a low-permeability filter cake that can help bridge or plug the loss zones.

As conventionally understood, particularly in relation to the textile industry, the term fiber is used herein to refer to a material that in its simplest physical form is elongated and has a length dimension that is significantly greater in numeric value than the numeric value of its cross sectional dimension. A fiber can thus be an elongated material characterized by one or multiple ends or bundles of the same or different material that have multiple filaments that can be discontinuous or continuous and are unconsolidated, thereby retaining significant mobility between the filaments. Filaments are typically considered to be single units of continuous or discontinuous (i.e. those having finite length) material. The term yarn or staple yarn can thus, in turn, refer to an elongated material that comprises a consolidated fiber including discontinuous filaments, where the consolidated fiber has a substantial tensile strength and unity along the length of the yarn and filament mobility is present, but limited. One or more continuous filaments may also be present in a yarn or staple yarn.

A great variety of fibers are suitable for use in the compositions hereof, and they can, for example, be hydrophilic (i.e., can be readily wetted by water), hydrophobic, or any combination thereof along the fiber. Such fibers can be obtained or fabricated from a large variety of materials including without limitation natural organic or inorganic materials; animal fibers such as wool or mohair; comminuted plant materials including vegetable fibers such as fibers from wood, cotton, sisal, flax, kenaf, coir, jute, lechuguilla, hemp, sugar cane or cellulose (rayon); mineral fibers such as those from asbestos, basalt or wollastonite; fibers from glass, ceramics and metals such as metallic alloys, painted metals, polymer-coated metals, hollow metals, hollow painted metals, hollow coated metals; fibers prepared from carbon and carbon-based compounds; and mixtures of any two or more of the foregoing.

Numerous varieties of all of the kinds of fibers mentioned above that are suitable for use herein are available commercially, and the methods for making such fibers are well known. Glass fibers, for example, can be made from silica sand, limestone and soda ash, which are melted in a furnace at about 2500° F., after which the melt is fed through electrically-heated platinum bushings. The fine strands emerging therefrom can be wound, drawn, twisted and plied into yarn; can be chopped for collection on a creel; or can be cooled with air jets and collected on a belt or drum as web or batt of shortened lengths. Methods for making glass fibers are further discussed in references such as U.S. Pat. Nos. 2,571,457, 2,987,762 and 2,993,302. Metal fiber can be prepared by methods in which the fiber is shaved from wire or foil (such as in the preparation of steel wool), bundle drawn from larger diameter wire, cast from molten metal, or grown around a seed (usually carbon). Methods for making metal fibers are further discussed in references such as U.S. Pat. Nos. 3,087,233, 4,703,898, 7,048,996 and GB889583. And, many animal- and vegetable-source fibers are processed using well known carding technology in which metal pins or teeth disentangle, straighten, sort and align individual pieces of material for eventual collection steps that can include stretching, breaking, winding, matting and/or twisting.

Synthetic polymer fibers suitable for use herein can, for example, be prepared from polyesters, polyamides, polyolefins, polyaramids, acrylic polymers, polyurethanes, phenol/novolac polymers, polyvinyl alcohols; and mixtures of any two or more of the foregoing. Polyesters may include, for example, polyethylene terephthalate, polytriphenylene terephthalate, polybutylene terephthalate, aliphatic polyesters such as polylactic acid or polyglycolic acid, and combinations thereof. Polyamides may include, for example, nylon 6, nylon 6,6, and combinations thereof. Polyolefins may include, for example, propylene based homopolymers, copolymers, and multi-block interpolymers, and ethylene based homopolymers, copolymers, and multi-block interpolymers, and combinations thereof; and may also include ethylene copolymers such as ethylene-vinyl acetate copolymer, ethylene-methacrylic acid copolymer and ethylene-acrylate copolymer, elastomer resins such as poly-alpha-olefin and styrene-ethylene-butylene-styrene copolymer, low-density polyethylene, linear low-density polyethylene, high-density polyethylene, polypropylene, and propylene copolymers such as ethylene-propylene copolymer and ethylene-butene-propylene copolymer; and mixtures of any two or more of the foregoing.

In another embodiment, a fiber suitable for use herein can be prepared from any resin that exhibits thermoplastic behavior by processing the resin through an extruder. The resin is ordinarily purged with dry air or nitrogen before being fed to the extruder, and, after being hot-melted and pumped through the extruder, it can be discharged as a filament from a spinneret; or groups of such filaments can be discharged from the spinneret and bundled. If desired, a suitable die can be employed to create multicomponent fibers, typical structures for which include side-by-side, sheath-core, segmented pie, islands-in-the-sea, and combinations thereof. After the filaments are cooled by air or water, they can be wound with a prescribed length onto a bobbin, thereby producing undrawn yarn. Undrawn yarn can then, if desired, be drawn as it is passed after heating between sets of rollers having different speeds. A typical drawing ratio would be about 120% or more, about 150% or more, or about 200% or more, and yet about 600% or less, or about 550% or less, or about 500% or less. A typical drawing temperature would be exceed the glass transition temperature of the resin by about 1° C. or more, or about 5° C. or more, or about 10° C. or more, and yet about 50° C. or less, or about 35° C. or less, or about 20° C. or less. Fibers can be obtained when drawn yarn is then cut to a desired length using, for example, a rotary blade fiber bundle cutter, or when it is broken by being stretched. The yarn can further, if desired, be subjected to heat setting treatment for the purpose of suppressing shrinkage of the fiber, creating a more highly oriented fiber by relaxation treatment, and reducing the moisture ratio of the fiber. Fibers made by extrusion can be any of a variety of shapes including round, cylindrical, flat ribbon, flake or platelette, spiraled coil, trilobe, star, disoriented or irregular. Methods of fibers by extrusion are well known and are further described, for example, in U.S. Pat. No. 7,851,391.

In one particular embodiment, a fiber used herein can be prepared from polyvinyl alcohol, or from a vinyl alcohol/aliphatic polyester copolymer, or from a physical blend of a polyvinyl alcohol and an aliphatic polyester. An aliphatic polyester frequently used in such situations is a polylactic acid and/or polyglycolic acid. A PVOH fiber can be made by the general thermoplastic process described above, or by other methods discussed in the art, for example in references such as U.S. Pat. Nos. 2,610,360, 2,906,594, 3,063,787, 3,066,999, 3,102,775, 3,850,901 and 4,713,290. PVOH fibers suitable for use herein can be obtained commercially from Kuraray Co., Ltd., Tokyo, Japan in the form of KURALON™ synthetic fiber, which is available as staple fiber, spun yarn, short-cut fiber and filament. In another embodiment, a preferred PVOH fiber for use herein is available from Kuraray in the form of KURALON™ VPB 105-2 synthetic fiber.

In one embodiment, a fiber as used herein can be characterized by a water dissolution temperature of about 60° C. or more, or about 70° C. or more, or about 80° C. or more, or about 85° C. or more, and yet about 100° C. or less, or about 98° C. or less, or about 95° C. or less, or about 90° C. or less. Water dissolution temperature is determined for this purpose in accordance with the measurement regime set forth in ASTM D1003.

In another embodiment, in addition to or as an alternative to each and all of the characteristics described above, a fiber as used herein can also be characterized by a fiber fineness or linear density in the range of about 0.1 dtex (g/10 km) or more, or about 0.5 dtex or more, or about 1 dtex or more, or about 2 dtex or more, and yet about 20 dtex or less, or about 15 dtex or less, or about 10 dtex or less, or about 5 dtex or less. Dtex is determined for this purpose in accordance with the measurement regime set forth in ASTM C305-14.

In another embodiment, in addition to or as an alternative to each and all of the characteristics described above, a fiber as used herein can also be characterized by an average fiber diameter in the range of about 5 microns or more, or about 7.5 microns or more, or about 10 microns or more, or about 12 microns or more, and yet about 25 microns or less, or about 22.5 microns or less, or about 20 microns or less, or about 17.5 microns or less. "Diameter" here includes the largest cross-sectional dimension in the case of measuring a cross section that is not a true circle, and fiber diameter is determined for this purpose in accordance with the measurement regime set forth in ASTM C305-14.

In another embodiment, in addition to or as an alternative to each and all of the characteristics described above, a fiber as used herein can also be characterized by a cut length in the range of about 0.5 mm or more, or about 1 mm or more, or about 2 mm or more, or about 5 mm or more, and yet about 30 mm or less, or about 25 mm or less, or about 20 mm or less, or about 15 mm or less. Cut length is determined for this purpose in accordance with the measurement regime set forth in ASTM C305-14. (Note, however, that fiber lengths as stated can, in certain instances, be somewhat imprecise in situations where fibers as cut to length are in fact a mixture of lengths distributed around an intended length).

In another embodiment, in addition to or as an alternative to each and all of the characteristics described above, a fiber as used herein can also be characterized by a tensile strength of at least about 2.5 cN/dtex. Tensile strength is determined for this purpose in accordance with the measurement regime set forth in ASTM D1445-05.

In another embodiment, in addition to or as an alternative to each and all of the characteristics described above, a fiber as used herein can also be characterized by a Young's modulus of at least about 2,300 kg/mm$^2$. Young's modulus is determined for this purpose in accordance with the measurement regime set forth in ASTM E111-17.

In another embodiment, there is provided by this invention a fiber that is composed of one or more polyvinyl alcohols, or a vinyl alcohol/aliphatic polyester copolymer, or a physical blend of a polyvinyl alcohol and an aliphatic polyester; wherein such fiber has a water dissolution temperature, as determined according to ASTM D1003, of about 60° C. or more and yet about 100° C. or less.

Other Additives

A composition of this invention may also optionally include one or more additives (other than plasticizers and fibers), which additives may include, for example, fillers (such as acid-soluble weighting agents), starches, slip additives, antioxidants, pigments, dyes, as well as mixtures thereof.

Certain of these additives can be present as part of the polyvinyl alcohol component, and certain can be added separately.

For example, fillers may be blended with the resin component to enhance mechanical properties and regulate the solubility curves of the compositions of this invention. The total amount of filler added can vary widely depending on the desired property modification, for example, up to about 50 wt %, or up to about 30 wt %, or up to about 5 wt %, based on the total weight of the compositions.

In many instances where a composition hereof is being used for downhole treatments, it is desirable to have the specific gravity of the composition be close to that of a carrier fluid in order to allow for pumping and satisfactory placement of a diverting agent or loss circulation control compositions using the selected carrier fluid. A weighting agent can be used for such purpose.

When used, an acid-soluble weighting agent filler can be blended with the polymers, before, during or after polymer blending. Weighting agent generally refers to any additive used to increase the density of the resin component. Acid-soluble weighting agents generally include substances such as natural minerals and inorganic and organic salts. For example, the weighting agent can comprise a metal ion selected from the group consisting of calcium, magnesium, silica, barium, copper, zinc, manganese and mixtures thereof, and a counterion is selected from the group consisting of fluoride, chloride, bromide, carbonate, hydroxide, formate, acetate, nitrate, sulfate, phosphate and mixtures thereof. Specific examples of such fillers include minerals such as $CaCO_3$, $CaCl_2$ and ZnO.

In one embodiment, a polyvinyl alcohol component that yields a combination of good solubility properties and density comprises: (a) from about 60 wt % to about 94 wt % polyvinyl alcohol polymer(s); (b) from about 5 wt % to about 40 wt % acid-soluble weighting agent; and (c) from about 1 wt % to about 15 wt % plasticizer, based on the combined weight of (a), (b) and (c).

In yet another embodiment, this invention provides a composition suitable for use in downhole treatments that includes a blend of a polymer component and a starch. Such blend can typically comprise from about 10 to about 90 parts by weight of the polymer component and from about 90 to about 10 parts by weight of a starch, based on 100 parts by weight of the combination. Preferably, however, there should be at least about 30 parts by weight polymer component in any starch blend. Suitable starches for use in the present invention include natural starches, synthetic starches, physically modified starches, chemically modified starches and mixtures thereof.

A monovalent metallic salt can be added to reduce the consequences of an acidic (high multivalent salt content) wellbore environment, such as disclosed in previously incorporated U.S. Provisional Appln. Ser. No. 62/967,940 (filed 30 Jan. 2020). The metallic part (cation) of the monovalent metallic salt (B) is preferably selected from lithium, sodium and potassium. The salt part (anion) of the monovalent metallic salt (B) is preferably selected from phosphate, carbonate and acetate. Preferred monovalent metallic salts are potassium carbonate, potassium phosphate, and sodium acetate, and mixtures thereof. Combinations of more than one monovalent metallic salt are also suitable. The content of the monovalent metallic salt is preferably from about 0.1, or from about 0.2, or from about 0.8, or from about 1.4, to about 20, or to about 15, or to about 10, or to about 8, parts by weight per 100 parts by weight of polyvinyl alcohol polymer(s).

When a composition of this invention is proposed for use as a diverting agent or plugging agent in a program of borehole remediation. it may be desirable to further add to the composition other materials in particulate form that will assist in reducing or stopping fluid loss by serving as building blocks in the formation of a plug in a fissure or fracture. Each particle of such material can become incorporated into a growing mud cake by coming to rest permanently in a hole, gap or void of appropriate size to accept but then retain the particle. Such supplemental particles can be obtained from materials selected from one or more members of the group comprising carbonate minerals, mica, rubber, polyethylene, polypropylene, polystyrene, poly(styrene-butadiene), fly ash, silica, mica, alumina, glass, barite, ceramic, metals and metal oxides, starch and modified starch, hematite, ilmenite, ceramic microspheres, glass microspheres, magnesium oxide, graphite, gilsonite, cement, microcement, nut plug and sand, and mixtures thereof. Solid plugging particles used in this manner may be in granular or lamellar form or both.

When such supplemental solid plugging particles are used, they may be present in the composition in an amount in the range of at least about 2 wt %, or at least about 5 wt %, or at least about 10 wt %, or at least about 15 wt %, and yet in an amount of not more than about 40 wt %, or not more than about 35 wt %, or not more than about 30 wt %, or not more than about 25 wt % of the total composition; and such particles can be used at sizes in the range of at least about 5 microns, or at least about 15 microns, or at least about 25 microns, or at least about 50 microns, and yet not more than about 1,000 microns, or not more than about 750 microns, or not more than about 500 microns, or not more than about 250 microns.

One or more additives in addition to those named can be incorporated into the compositions as necessary when they are used for downhole treatments. These optional additives include without limitation chelators, anti-oxidants, other pH-adjusting agents, oxidizing agents, other lost circulation materials (such as described in the previously incorporated references), scale inhibitors, corrosion inhibitors, clay control additives, iron control additives, reducers, oxygen scavengers and the like.

Combinations with Other Polymers

The compositions and kits of the present invention may also contain other polymers suitable for wellbore end uses, either as combined with or separate from the polyvinyl alcohol component.

One such polymer is an aliphatic polyester, which can be obtained, for example, by homopolymerization or copolymerization of an oxycarboxylic acid and/or a lactone; by an esterification reaction of an aliphatic dicarboxylic acid and an aliphatic diol; or by copolymerization of an aliphatic dicarboxylic acid, an aliphatic diol, and an oxycarboxylic acid and/or a lactone, such as disclosed in previously incorporated U.S. Provisional Appln. Ser. No. 63/029,153 (filed 22 May 2020).

Preferred examples of an aliphatic polyester, suitable for use herein and obtainable as set forth above, include hydroxycarboxylic acid-based aliphatic polyesters such as polylactic acid ("PLA") and polyglycolic acid ("PGA"); lactone-based aliphatic polyesters such as poly-ε-caprolactone; diol-dicarboxylic acid-based aliphatic polyesters such as polyethylene succinate and polybutylene succinate; copolymers thereof, such as glycolic acid-lactic acid copolymers ("PGLA"); copolymers in which either one or both of lactic acid and glycolic acid are polymerized with itself/themselves and other hydroxy-acid-containing moieties; mixtures of any of the foregoing; and the like. Aliphatic polyesters that use combinations of aromatic components such as polyethylene adipate/terephthalate may also be used.

Plasticizers maybe optionally added to the polyesters in an amount sufficient to increase the pliability of the polyesters component at the desired temperature. The plasticizer can be used to decrease the Tg of the polymer and allow the polymer to be designed into a desirable malleable particulate. In some embodiments of this invention, the plasticizers are present in an amount in the range of from about 0.5% to about 30% by weight of the polymer. Examples of plasticizers useful for this invention include, but are not limited to, polyethylene glycol (PEG), polypropylene glycol, polyethylene oxide, glucose monoesters, fatty acid esters, glycerol, glycerin diacetate monocaprylate, polypropylene and combinations thereof.

Further details can be had from previously incorporated U.S. Provisional Appln. Ser. No. 63/029,153 (filed 22 May 2020).

Preparation of Compositions and Particle Size Control

In this invention, PVOH resins are admixed for use with one or more fibers. The step of mixing can be performed prior to use of the composition with the result that the PVOH component and the fiber component both become physically bound to each other in the form of a pellet or particle that can itself be transported or otherwise handled as needed between the occurrence of manufacturing and eventual use.

Alternatively, when a kit is used instead of a physically blended composition, the kit contains a supply of a particulate polyvinyl alcohol polymer, and a supply of a fiber that is suitable for interaction with the polyvinyl alcohol polymer for the purpose of wellbore remediation. In such case, the step of mixing can be performed prior but close to, or at, the time of use of the components of the kit and in such manner that the components do not become physically bound to each other before use. In yet another embodiment, however, the two components do not themselves have to be mixed in any manner prior to use, and can be employed in such manner that, although there is a sequence or some other time variance in the occurrence of the effective usage of each of the components, they do eventually contact each other and thereby operate synergistically together and, in the manner of their combined effect, have a common, co-dependent usefulness that does not require actual physical pre-mixing to obtain.

In one particular situation in which it is desired to admix the components of the compositions hereof in a manner such that the components become physically bound to each other, a useful method of such type of mixing can involve melt mixing one or more fibers with a polyvinyl alcohol that is in granular and/or powdered form. Such melt mixing can be carried out at typical thermoplastic processing temperatures in the range, for example, of about 180° C. to about 210° C. on any of variety of known melt mixing devices such as extruders or pumped static mixers. Where it is desired to mix a fiber with a PVOH that does not possess thermoplastic characteristics, this can also be accomplished with melt mixing equipment through the carefully timed addition of an appropriate plasticizer to the process since, as noted above, PVOH in the unplasticized state has a high degree of crystallinity and shows little or no thermoplasticity before the occurrence of decomposition, which starts at about 170° C. (and becomes pronounced at 200° C.). The output of melt mixing a fiber and a PVOH resin to form a composition hereof is typically a pellet of conventional size and shape, which is obtained by forming a strand from the melt, cooling and cutting the strand. The resulting pellets have a relatively uniform size and shape, which are controlled by the shape of the exit die and regulation of the strand cutter.

In another embodiment hereof that involves preparing a composition in which the components are admixed in such manner that they become physically bound to each other, the mixing may be performed by compaction. However, it is also proposed herein to use methods of compaction to prepare polyvinyl alcohol compositions that are composed of varying but controlled amounts of particles that are in the small, medium and large size ranges, and thus to obtain a particle size distribution for such compositions that is multimodal and relatively dense. The result of performing compaction can thus be either (i) to (a) incorporate a filler into a composition when it is desired to form a composition in which the components are physically bound to each other, while (b) simultaneously obtaining a desired particle size distribution for the composition; or (ii) obtain only a desired particle size distribution for a particulate polyvinyl alcohol where a fiber is to be provided as a separate component of a kit. Compaction as used for the purpose of obtaining both or only one of the results described in the preceding sentence is conducted in the same manner, and the following discussion concerning size classification and selection of particle size ranges is thus applicable equally in both the cases of where a fiber is present in the composition during compaction, and where it is not.

For the purpose of providing a desired particle size distribution in a composition, it has been found desirable to mix together PVOH particles of differing types and sizes, and such result can be obtained herein by mixing together (i) PVOH granules obtained as described above by granulating a body undergoing gelation, (ii) PVOH powders that are small but not too small to be efficiently handled, and (iii) PVOH powders that are too small to be efficiently handled (such as fines or dust) and thus need to be compacted and crushed before mixture into a composition. PVOH granules and powders regardless of size are thus all PVOH particles, but they are different types of PVOH particles since they do differ in size and shape. PVOH granules, for example, may be described as fitting within the volume of a cuboid, as set forth above, or as having a shape that is subrounded but with high sphericity, similar to squashed oblate spheroid. By contrast, PVOH powder, as used herein, typically has jagged edges, and may be described as having very angular roundness and low sphericity. However, neither of the three types of PVOH particles used to form the compositions hereof differs chemically.

One source of a powder to be used herein for compaction purposes is the slurry process. In the slurry process as described above, extremely small PVOH particles (referred to herein as fines and/or dust) are produced in the polyvinyl alcohol composition during hydrolysis by the kneader mixer due to the pushing and shearing action from agitation caused by the kneader blades, and dust is also generated by mechanical attrition in pneumatic conveying and in the dryer cyclone. Thus, a polyvinyl alcohol as a slurry in a liquid solvent can be provided, the liquid can be removed from the PVOH output, but the output when dried contains fines and/or dust and thus is best handled by being compacted and then crushed. In one embodiment of this invention, the material to be compacted can be the entire output of the slurry reactor, but in other embodiments, the output of the slurry reactor can first be classified by size on a sieve device, and the material to be compacted can be limited to only that portion of the slurry output that is smaller than 325 mesh, or smaller than 200 mesh, or smaller than 140 mesh. PVOH powder can of course also be provided as the output of PVOH processes other than the slurry process, and such powder may, as put out by such process, be large enough to be efficiently handled, or may need to first be compacted and crushed, as described above, when necessary to obtain a particle size large enough to be efficiently handled for mixing.

Compaction of PVOH, or PVOH in a compositional mixture with or without fiber(s), can be carried out using conventional compaction methods and equipment, such as a double roll compactor, which places the component(s) to be compacted under extreme pressure. Where the blended component(s) adhere to themselves in the compaction process, no additional binder may be needed to agglomerate the mixture into a compacted object. That is, PVOH and the various other components hereof, such as fibers, may function as their own binder for the agglomerate. Further, however, as discussed above, additives other than fibers, such as fillers, starches and plasticizers, may be also added to the composition as necessary to enhance the agglomeration of the component(s) thereof. Desirably such compaction and any ensuing pulverization, is a dry process that does not require an additional drying step.

Resin compaction can be carried out using conventional compaction methods and equipment, such as a double roll compactor. In a double roll compactor, the mixture is fed between two counter-rotating roll presses. Roll compactors with smooth rolls compact a powdered material into an object such as a sheet with consistent hardness. A roller style press combines torque, via a roll drive system, and thrust, via cylinders in a stressed frame, to agglomerate fines. Agglomeration involves a chemical process, in which two counter-rotating rolls press particulate material into larger pieces by pulling or pushing fine material into the nip zone of a dual roll press whereupon the rolls pull the material through the roll nip, and produce dense output. The agglomerated materials put out by a double roll compactor typically form an object such as a sheet, ribbon or flakes, have a reduced surface area, and have an increased product bulk density. The rolls apply extreme pressure to press the mixture into a sheet- or ribbon-like form. The object formed by compaction can also be described, for example, as a block, chunk, lump, strand, cable, cylinder, briquette, or other type of three-dimensional shape, mass or workpiece. Desirably, the pressure applied during compaction is at least about 5 ksi, or at least about 7.5 ksi, or at least about 10 ksi, or at least about 20 ksi, wherein "ksi" refers to kilopounds per square inch. After a certain pressure point, the compaction reaches an effective maximum where there is very little increase in density per unit of additional pressure. In one embodiment, this effective maximum is about 30 ksi of pressure. Other types of specialized compactors that can be used for compaction of the compositions hereof can also include a briquetter or a single station press.

Once a composition hereof, has been subjected to compaction, especially on a roll mill, the sheet output of the compaction process is passed to a crusher. Where compaction is performed by a roll mill, the crusher is often incorporated directly into the same piece of equipment as the roll mill. The crusher will crush or pulverize the compacted sheet to powder of a predetermined size range wherein such powder is random in shape but is desirably reasonably uniform in size and has a relatively narrow size distribution around the target. The crusher can be adjusted such that it produces powder at a selected, desired size range, such as any of the mesh size ranges set forth herein. A screening device can further sort the powder according to size, and send any that is smaller than a predetermined lower limit back to the compactor, and send any that is larger than a predetermined upper limit back to the crusher. In cases where it is possible to use a briquetter or single station press to make powder in a desired size range directly from compaction, it may not be necessary to further process the powder on a crusher.

The step of crushing a compacted sheet may be performed with a variety of equipment as known in the art and as suitable to a particular situation such as a bead mill, ball mill, jet mill, rod mill, hammer mill or pin mill. A hammer mill, for example, may have cutting blades with either a knife edge for a cleaner cut or a blunt edge for greater impact and breaking force. The output of the crusher is obtained as a powder of a composition hereof, either with a fiber already incorporated therein by compaction, or not. Several options are available at this point, whether the fiber has already been incorporated into the composition or is to be provided later at a time of end use, such as for borehole remediation: (i) the powder can be sent out for use as is; or (ii) the powder itself can be subjected to size classification; or (iii) the powder can be blended with PVOH granules that have been obtained from a body undergoing gelation, and (a) the mixture of powder and granules can be sent out for use as is, or (b) the mixture of powder and granules can be subjected to size classification. Passing the powder, or blend of powder and granules, on to a step of size classification will not be affected by the presence or absence of a fiber as a compacted component of the powder, since the grains of powder will be processed as to size by the classifier with the same effect whether fiber is present therein or not.

Size classification of particles, whether powder alone or a mixture of powder and granules, can be performed with a sieve device, and the output of the size classification makes possible the collection of the particles of the composition in the form of separate groups of particles, each group containing only particles that fall within one particle size range. Size classification, or grading or sorting a batch of particles according to size, is typically performed on a mechanical shaker having the ability to obtain separation using sieves. A typical sieve separator involves a nested column of sieves, each sieve being formed from wire mesh cloth or screen. The sieve in the top pan has the largest mesh openings, and each succeeding pan below has progressively smaller size mesh openings such that each lower sieve in the column receives particles that were not retained on the larger mesh openings of the sieve immediately above it. At the base is a round pan with no openings, called the receiver, which collects all particles that were too small to be retained on any of the sieve screens above. The sieve openings, or mesh sizes, of the various screen-bottomed pans can be selected to be the same as the various sizes of particles desired for use in preparing compositions, and each pan of such selected size will retain particles that are large enough that they do not fall through. The column is vibrated by a mechanical shaker, usually for a fixed amount of time, and the shaking action gives the particles in the batch that was originally placed on the top screen enough motion to either be retained on a screen or fall through to the bottom collector pan. Those that do not fall through form the supply of particles of the selected sizes to be used as mixing components. In an alternative embodiment of any of the methods or compositions set forth elsewhere herein, there may be further provided a step of contacting the particles hereof with a plasticizer prior to sorting the particles according to size.

If the particles retained on each pan are removed and stored separately according to size, this enables providing a method of preparing a composition hereof by combining selected amounts of previously prepared particles of the composition having known sizes. To prepare a composition in such manner, selected amounts of particles of the composition are combined in admixture according to a formulated recipe, where each different amount of particles has a different, known size. The required amounts of the particles of different size are withdrawn from the inventory of sized particles created by a sieving operation wherein screens of mesh sizes are used matching the sizes desired to be available in the inventory. The groups of particles of different sizes withdrawn from inventory and assembled according to the formulated recipe can then easily be dry blended to form the composition. As large an inventory as desired of particles of different sizes, for use in selected amounts in the preparation of compositions, can be prepared by running the sieve operation more than once using a combination of screens of a variety of different size ranges. The same procedure is followed of gathering the supply of particles on each screen and storing all particles retained on the screen separately according to size to serve as the stock for supplying particles of all the different sizes needed to formulate compositions. This approach provides great flexibility when determining what relative amounts of particles of what size it is desired to have in a preferred composition, and enables providing a composition of this invention in the form of a mixed combination of groups of varying, but controlled, amounts of particles in the small, medium and large size ranges, and thus to provide a particle size distribution for the composition that is relatively dense.

There is thus provided a method of preparing particles of the compositions hereof by mixing components of the composition by compaction to produce a slab, crushing the slab to produce powder, and classifying particles (whether powder alone or powder mixed with granules) according to size. As a result, particles of different sizes can be used to prepare the composition hereof by selecting desired amounts of particles of different but preferred sizes, and mixing those particles together, and this can be done whether a fiber has already been incorporated into the composition or not.

In one embodiment, for example, the compositions resulting from the admixture of such size-classified particles can produce a composition hereof, whether it contains PVOH without fiber or PVOH blended with fiber, that contains (i) a selected amount of particles that are smaller than 80 mesh size and yet are 325 mesh size or larger, and/or (ii) a selected amount of particles that are 80 mesh size or larger. In another embodiment of the foregoing composition, the particles having a size such that they fall into one or both of the immediately preceding ranges can constitute at least about 2 wt %, or at least about 3 wt %, or at least about 5 wt %, or at least about 10 wt %, and yet no more than about 20 wt %, or no more than about 18 wt %, or no more than about 15 wt %, or no more than about 12 wt % of the total weight of the composition.

In another embodiment, the compositions resulting from the admixture of size-classified particles can produce a composition hereof, whether it contains PVOH without fiber or PVOH blended with fiber, that contains a selected amount of particles that are 35 mesh or larger, or are 25 mesh or larger, or are 18 mesh or larger, or are 14 mesh or larger. In yet another embodiment, the particles having a size such that they fall into the immediately preceding size ranges can constitute at least about 90 wt %, or at least about 95 wt %, or at least about 98 wt %, or at least about 99 wt % of the total weight of the composition.

In another embodiment, the compositions resulting from the admixture of size-classified particles can produce a composition hereof, whether it contains PVOH without fiber or PVOH blended with fiber, that contains a selected amount of particles that are 80 mesh or larger, or are 60 mesh or larger, or are 40 mesh or larger. In yet another embodiment, the particles having a size such that they fall into the immediately preceding size ranges can constitute at least about 80 wt %, or at least about 85 wt %, or at least about 90 wt %, or at least about 95 wt % of the total weight of the composition.

In an alternative embodiment of any of the methods or processes set forth above, there may be further provided a step of contacting the polyvinyl alcohol particles of the composition with a plasticizer prior to sorting the particles according to size.

The different compositions disclosed herein, or formed by the processes disclosed herein, whether they contain PVOH without fiber or PVOH blended with fiber, may in various embodiments that are alternatives to, or alternative aspects of, particle size characterizations set forth elsewhere herein, have a particle size distribution described by one or more of the following size ranges:

A composition wherein at least about 97.5 wt %, or at least about 99 wt %, or at least about 99.5 wt %, of the particles have a particle size of 325 mesh or larger.

A composition wherein at least about 96 wt %, at least about 98 wt %, or at least about 98.5 wt %, of the particles have a particle size of 200 mesh or larger.

A composition wherein at least about 95 wt %, or at least about 97 wt %, or at least about 98 wt %, of the particles have a particle size of 140 mesh or larger.

A composition wherein at least about 85 wt %, or at least about 90 wt %, or at least about 95 wt %, of the particles have a particle size of 80 mesh or larger.

A composition wherein at least about 80 wt %, or at least about 85 wt %, or at least about 90 wt %, of the particles have a particle size of 50 mesh or larger.

A composition wherein at least about 75 wt %, or at least about 80 wt %, or at least about 85 wt %, of the particles have a particle size of 35 mesh or larger.

A composition wherein at least about 65 wt %, or at least about 70 wt %, or at least about 75 wt %, of the particles have a particle size of 20 mesh or larger.

A composition wherein at least about 55 wt %, or at least about 60 wt %, or at least about 65 wt %, of the particles have a particle size of 12 mesh or larger.

In yet another embodiment of a composition hereof, the particle size distribution of the particles of the composition may be described by a set of values falling within the stated content ranges given by a combination of any two or more of the mesh screen sizes listed above.

In another embodiment, a composition of this invention, whether it contains PVOH without fiber or PVOH blended with fiber, may have a content of free dust or fines of the compositional components in an amount of less than about 3%, or less than about 2.5%, or less than about 2%, or less than about 1.5%, or less than about 1%. Content of free dust or fines may be determined quantitatively as the weight percent of free dust or fines of a sample of the composition that could be eluted from the sample with $4.7 \times 10^{-4}$ m$^3$/s (1.0 cfm) of air in 5 minutes using an open "ACE" B (70~100 micron) porosity fritted funnel as the sample receptacle. The process for determining the content of free dust or fines in a sample is more fully described in U.S. Pat. No. 4,389,506.

In any of the compositions hereof that are described herein by particle size range, there can, if desired, be added the further feature that the particles thereof can be dried to reduce the content of a monohydric alcohol therein to less than about 5 wt %, or less than about 3 wt %, or less than about 2 wt %, or less than about 1 wt %, or less than about 0.5 wt %. For such purpose, contact dryers, shovel dryers, disk dryers and fluidized bed dryers are all suitable as apparatus in which thermal drying can be carried out. Suitable commercial brands of dryers include for example Bepex® dryers and Nara® dryers.

In any of the methods as described above, the type and amount of particles to be admixed to form a composition is desirably determined in a manner to balance the content of each of the size fractions in the composition to give a composition that has a negligible amount of dust but that does not have a disproportionate amount of large particles either, as dictated by the needs of the intended use of the composition. Thus a composition having a multimodal, relatively dense particle size distribution or gradation may be provided in which most of the particles are in the medium to large size ranges but there are still enough small particles to fill the voids between the larger particles.

Compositional Properties

In one embodiment, this invention provides a blended, particulate composition that contains a fiber component and a polyvinyl alcohol component as described above.

In another embodiment, this invention provides a composition as aforesaid wherein a polyvinyl alcohol cocomponent is present in the composition at a concentration in the range of about 60 wt % or more, or about 70 wt % or more, or about 80 wt % or more, or about 85 wt % or more, and yet about 99 wt % or less, or about 97.5 wt % or less, or about 95 wt % or less, or about 90 wt % or less, by weight of the total composition.

In another embodiment, this invention provides a composition as aforesaid wherein the polyvinyl alcohol component comprises an acid-functional polyvinyl alcohol copolymer which is characterized by (a) an unsaturated acid content of from about 0.1 mol % to about 15 mol % based on the total moles of monomers, (b) a viscosity-average degree of polymerization of from about 300 to about 3000, (c) a degree of hydrolysis of from about 70 mol % to 100 mol %, and (d) substantially solubility in either deionized water or brine at a temperature of 90° C. or higher.

In another embodiment, this invention provides a composition as aforesaid wherein a fiber component is present in the composition at a concentration in the range of about 1 wt % or more, or about 2 wt % or more, or about 5 wt % or more, or about 10 wt % or more, and yet about 20 wt % or less, or about 15 wt % or less, or about 10 wt % or less, or about 5 wt % or less, by weight of the total composition.

In another embodiment, this invention provides a kit that includes a supply of a polyvinyl alcohol component, and a separate supply of a fiber component that is suitable for interaction with the polyvinyl alcohol component for the purpose of wellbore remediation. Such a kit provides an alternative to a physically blended composition, and a step of mixing of the components of the kit can be performed prior but close to, or at, the time of use of the components, and in such manner that the components do not become physically bound to each other before use. In yet another embodiment, however, the two components do not themselves have to be mixed in any manner prior to use, and can be employed in such manner that, although there is a sequence or some other time variance in the occurrence of the effective usage of each of the components, they do eventually contact each other and thereby operate synergistically together and, in the manner of their combined effect, have a common, co-dependent usefulness that does not require actual physical pre-mixing to obtain.

In a kit as described above, the ratio of the weight of the supply of polyvinyl alcohol component to the weight of the fiber component is at least about 1, or at least about 2, or at least about 4, or at least about 6, and yet is about 99 or less, or about 50 or less, or about 35 or less, or about 15 or less.

In another embodiment hereof, in addition to or as an alternative to each and all of the characteristics described above, a fiber as used herein can also be characterized by a ratio of length to diameter (frequently referred to as aspect ratio), calculated from the values determined as described above, in the range of about 15 or more, or about 50 or more, or about 125 or more, or about 250 or more, and yet about 600 or less, or about 500 or less, or about 400 or less, or about 300 or less.

In another embodiment hereof, in addition to or as an alternative to each and all of the characteristics described above, two or more different fibers can be used together in a composition or kit hereof wherein each fiber has a different cut length value calculated from the values determined as described above, and at least one pair of the two or more fibers is characterized by a ratio of the different lengths that is in the range of about 0.5 or more, or about 1 or more, or about 2 or more, or about 5 or more, and yet about 20 or less, or about 17.5 or less, or about 15 or less, or about 10 or less.

In another embodiment hereof, in addition to or as an alternative to each and all of the characteristics described above, two or more different fibers can be used together in a composition or kit hereof wherein each fiber has a cut length calculated from the values determined as described above, wherein in one pair of fibers a first fiber (F1) has a different length (L1) than the length (L2) of a second fiber (F2) [i.e. L1≠L2], wherein the weight percent content of F1 used in the composition or kit is W1, and the weight percent content of F2 used in the composition or kit is W2, each being based on the total weight of the composition or supply of fibers in the kit, and wherein the content of F1 and F2 used therein is characterized by a ratio of their respective weight percent content values (W1/W2) that is in the range of about 0.5 or more, or about 1 or more, or about 2 or more, or about 5 or more, and yet about 20 or less, or about 17.5 or less, or about 15 or less, or about 10 or less.

In another embodiment hereof, in addition to or as an alternative to each and all of the characteristics described above, two or more different fibers can be used together in a composition or kit hereof wherein each fiber has a different diameter value calculated from the values determined as described above, and at least one pair of the two or more fibers is characterized by a ratio of the different diameters that is in the range of about 0.5 or more, or about 1 or more, or about 2 or more, or about 5 or more, and yet about 20 or less, or about 17.5 or less, or about 15 or less, or about 10 or less.

In another embodiment hereof, in addition to or as an alternative to each and all of the characteristics described above, two or more different fibers can be used together in a composition or kit hereof wherein each fiber has a diameter calculated from the values determined as described above, wherein in one pair of fibers a first fiber (F1) has a different diameter (D1) than the diameter (D2) of a second fiber (F2) [i.e. D1≠D2], wherein the weight percent content of F1 used in the composition or kit is W1, and the weight percent content of F2 used in the composition or kit is W2, each being based on the total weight of the composition or supply of fibers in the kit, and wherein the content of F1 and F2 used therein is characterized by a ratio of their respective weight percent content values (W 1/W2) that is in the range of about 0.5 or more, or about 1 or more, or about 2 or more, or about 5 or more, and yet about 20 or less, or about 17.5 or less, or about 15 or less, or about 10 or less.

In another embodiment hereof, in addition to or as an alternative to each and all of the characteristics described above, a fiber characterized by a ratio of length to diameter as set forth above can further be used to form a particulate composition in which the fiber and a polyvinyl alcohol are physically bound to each other, and in which the particles of the composition are characterized in that at least about 97.5 wt % of particles have a particle size of 325 mesh or larger, at least about 95 wt % of the particles have a particle size of 140 mesh or larger, and at least about 75 wt % of the particles have a particle size of 35 mesh or larger.

In another embodiment hereof, in addition to or as an alternative to each and all of the characteristics described above, a fiber characterized by a ratio of length to diameter as set forth above can further be used together with a particulate polyvinyl alcohol to form a kit, wherein the particles of the polyvinyl alcohol in the kit are characterized in that at least about 97.5 wt % of the particles have a particle size of 325 mesh or larger, at least about 95 wt % of the particles have a particle size of 140 mesh or larger, and at least about 75 wt % of the particles have a particle size of 35 mesh or larger.

In another embodiment hereof, in addition to or as an alternative to each and all of the characteristics described above, two or more different fibers can be used together in a composition or kit hereof wherein each fiber has a ratio of length to diameter (L/D) calculated from the values determined as described above, wherein in one pair of fibers a first fiber (F1) has a different L/D [(L/D)1] than the L/D [(L/D)2] [i.e. (L/D)1≠(L/D)2] of a second fiber (F2), wherein the weight percent content of F1 used in the composition or kit is W1, and the weight percent content of F2 used in the composition or kit is W2, each being based on the total weight of the composition or supply of fibers in the kit, and wherein the content of F1 and F2 used therein is characterized by a ratio of their respective weight percent content values (W 1/W2) that is in the range of about 0.5 or more, or about 1 or more, or about 2 or more, or about 5 or more, and yet about 20 or less, or about 17.5 or less, or about 15 or less, or about 10 or less. Using two or more different fibers, each having a different L/D, can be advantageous in terms of the fact that some long, thin fibers can be too flexible and become entangled in the pumping machinery whereas some short, thicker fibers can be too brittle and be deformed or broken when pumped through restrictions in the drill string. Ideally, a balance is struck between the competing characteristics of fibers having different L/Ds because using mixtures is desirable in many ways, not the least of which is that the incorporation of thin, flexible fibers may help to suspend the thicker, more stiff fibers that otherwise could not be used alone because they would settle during injection.

In another embodiment hereof, in addition to or as an alternative to each and all of the characteristics described above, two or more different fibers can be used together in a particulate composition that also contains a polyvinyl alcohol physically bound to the fiber, wherein each fiber has a ratio of length to diameter (L/D) calculated from the values determined as described above, wherein in one pair of fibers a first fiber (F1) has an L/D in the range of about 15 or more and yet about 300 or less, wherein a second fiber (F2) has an L/D in the range of about 250 or more and yet about 600 or less, and wherein at least about 97.5 wt % of the particles of the composition have a particle size of 325 mesh or larger.

In another embodiment hereof, in addition to or as an alternative to each and all of the characteristics described above, two or more different fibers can be used together in a kit hereof that also contains a particulate polyvinyl alcohol, wherein each fiber has a ratio of length to diameter (L/D) calculated from the values determined as described above, wherein in one pair of fibers a first fiber (F1) has an L/D in the range of about 15 or more and yet about 300 or less, wherein a second fiber (F2) has an L/D in the range of about 250 or more and yet about 600 or less, and wherein at least about 97.5 wt % of the particles of the polyvinyl alcohol have a particle size of 325 mesh or larger.

Uses of the Compositions Hereof

As noted above, the compositions hereof can be used in fluid injection operations for treatment of subsurface wellbores by processes as generally known in the art, and as exemplified in the many previously incorporated references.

The compositions hereof can be, and generally are, used in the servicing of vertical wells, but they are equally applicable to wells of any orientation. In addition, although the description herein may be presented in terms of servicing hydrocarbon-production wells, the disclosed methods can be used for wells for the production of other fluids, such as water or carbon dioxide, or, for example, for injection or storage wells.

The compositions of this invention have suitable stability for sufficient time periods to be useful in subterranean formations wherein downhole temperatures typically can range from about 100° F. up to about 250° F., although, in most cases, these compositions are used at temperatures in the range of about 190° F. to about 210° F. When a composition hereof is being used for a downhole treatment, the particle size distribution thereof sought to be obtained from the processes and methods of this invention can vary widely depending on the permeability of the substrate, the nature of the carrier fluid, the subsurface temperature profile, and the particular polyvinyl alcohol composition being used.

The compositions and kits disclosed in this invention can be used in drilling environments having either water-based muds, oil-based muds, or oil/water invert muds. Water-based muds are typically slurries of clay solids and polymers in either fresh water, sea water, brine, mixtures of water and water-soluble organic compounds, or mixtures thereof. The aqueous portion of the fluid may be formulated with mixtures of selected salts in fresh water, which salts may include alkali metal chlorides, hydroxides, or carboxylates, for example. In other embodiments, the brine may include seawater, or aqueous solutions wherein the salt concentration is adjusted to be greater or less than that of sea water. Salts that may be found in seawater include sodium, calcium, aluminum, magnesium, potassium, strontium, and lithium salts of chlorides, bromides, carbonates, iodides, chlorates, bromates, formates, nitrates, oxides, phosphates, sulfates, silicates, and fluorides. Salts that may be incorporated into a brine include any one or more of those present in natural seawater, or any other organic or inorganic dissolved salts. Density of a mud may be controlled by increasing the salt concentration in the brine (up to saturation). In one particular embodiment, a brine may include halide or carboxylate salts of mono- or divalent cations of metals, such as cesium, potassium, calcium, zinc, and/or sodium.

Oil-based (oleaginous) muds can include a natural or synthetic oil, and more preferably is selected from the group including diesel oil, mineral oil, a synthetic oil such as hydrogenated and unhydrogenated olefins including poly (alpha olefin)s, linear and branched olefins and the like, polydiorganosiloxanes, siloxanes or organosiloxanes, esters of fatty acids, straight chain, branched and cyclical alkyl ethers of fatty acids; other hydrophobic materials; and mixtures thereof. Oil-based muds may also be invert emulsions of oil in which up to 50% water is dispersed in the oil, with the oil being the external phase and water being the internal phase.

A sealing composition can be pumped down the wellbore at high pressure and into the leaking zone(s) to be plugged, and the sealing composition will enter the weakest portions of the zone first followed then by other portions including those where fluids crossflow through the wellbore or blow out into the wellbore. The sealing composition stops the loss of service fluids and allows high drilling fluid densities to be utilized when needed while drilling ahead. Once the sealing composition has been placed, it increases the fracture gradient to a higher value that can eliminate the need for intermediate casing, drilling liners and the like. Because the sealing composition readily diverts drilling fluids to other weak zones in the well bore, the integrity of the entire well bore is improved by the sealing composition.

The compositions and methods disclosed herein thus provide solutions for a variety of situations, including without limitation curing lost circulation of downhole fluids, fluid loss during gravel packing, fluid loss during wellbore consolidation treatments, cracking of cements, and other problems in oilfield operations. The compositions and methods may also be used in remedial or closure treatments, one example of which is the plugging of hydraulic fractures in formations that are no longer sufficiently productive.

Consistent with the foregoing, this invention provides a method of reducing the flow of one or more fluids from a borehole into an adjacent subsurface geologic formation, where the borehole is created by the drilling and installation of a wellbore within such subsurface formation, by introducing a composition according to this invention into an opening in a wall of the formation. In one particular embodiment, this invention can further provide a method of reducing the loss from a borehole of one or more valuable fluids that are undesirably flowing into an adjacent subsurface geologic formation, where the borehole is created by the drilling and installation of a wellbore within such subsurface formation, by introducing a composition according to this invention into an opening in a wall of the formation through which the valuable fluid(s) are flowing. Performing such a method typically involves introducing the composition into an opening in a wall of the formation to create a mud cake and temporarily or permanently seal the opening therein, which step of introducing can be or include a step of pumping, injecting, releasing, spotting, circulating, or otherwise emplacing a composition hereof into an opening in a wall of a formation. Access to the opening in the wall is obtained from the wellbore, or from a device that has been inserted in the wellbore and is used for that purpose.

Any one or more of the compositions of this invention, whether described above in terms of size classification, or described elsewhere herein in other terms, can be used in the step of introducing such composition into an opening in the wall of a subsurface formation.

In one embodiment, a sealing composition can be placed into a wellbore in the form of a "single pill" fluid; that is, all components of the sealing composition are mixed and introduced into the wellbore as a single composition and as a single stream. In such case, the sealing composition is typically activated by downhole conditions to form a seal in one or more leaking zones, and for such purpose the sealing composition may be placed downhole through multiple ports in the drill bit.

In an alternative embodiment, the sealing composition can be formed downhole by the mixing of a first stream containing one or more sealing components and a second stream containing additional sealing components. In such an embodiment, the compositional components can be selected such that the first and second streams react with each other, or one group of components can be encapsulated and introduced in that form instead of as a stream. When differing groups of components are introduced as independent fluid streams, one of them may be introduced, for example, through the tubular string of drill pipe, and the other may be introduced in the anulus between the drill string and the wall of the borehole.

Consistent with the above discussion of the introduction of a composition hereof into a downhole environment in discrete steps or by means of separate injection of components, a further embodiment of this invention provides a method of reducing the flow of one or more fluids from a borehole into an adjacent subsurface geologic formation, where the borehole is created by the drilling and installation of a wellbore within such subsurface formation, by introducing a polyvinyl alcohol into an opening in a wall of the formation, followed by introducing a fiber into an opening in a wall of the formation at the same location; or by introducing a fiber into an opening in a wall of the formation, followed by introducing a polyvinyl alcohol into an opening in a wall of the formation at the same location. As set forth above, the flow of fluids can be the loss of desired fluids by flow into the adjacent formation, and the introduction of PVOH followed by fibers, or fibers followed by PVOH, is spotted at the location of the opening where the flow of fluids is occurring and will, desirably, by reduced or eliminated.

There is thus provided herein a method of reducing the flow of fluid from a wellbore installed within a subterranean, geologic formation into the formation through an opening in a wall of the wellbore by introducing a composition hereof into the opening in the wall. In another embodiment, there is herein provided a method of reducing the flow of fluid from a wellbore installed within a subterranean, geologic formation into the formation through an opening in a wall of the wellbore by introducing a polyvinyl alcohol copolymer into the opening in the wall, and introducing a fiber into the opening in the wall, wherein the copolymer and fiber are introduced into the opening simultaneously, or the copolymer is introduced into the opening before the fiber, or the fiber is introduced into the opening before the copolymer.

Methods for introducing plugging agents into a wellbore to bridge, seal or plug leaks in leaking subterranean zones are further described, for example, in U.S. Pat. Nos. 5,913, 364, 6,167,967 and 6,258,757.

EXAMPLES

The following examples will facilitate a more complete understanding of this invention, but it is understood that the invention is not limited to the specific embodiments presented below.

Examples 1-6 Various compositions prepared according to the disclosure hereof were evaluated according to the following solubility test: 30 grams of a composition hereof and 470 grams of either deionized ("DI") water or brine were added to a vessel equipped with an agitator. The vessel was then placed in a water bath for heating. The water bath heat controller was set at 149° F., and the speed of the agitator inside the vessel was set at 20 RPM. A timer was started as soon as the temperature inside of the vessel reached the desired target temperature. A 10 mL sample of the contents of the vessel was then collected in a centrifuge tube at the following times after the timer had started: 15, 30, 60, 120, 180, 240, 300, 360 and 420 minutes. The 10 mL sample was placed in centrifuge for 10 minutes and spun at 1,500 RPM. The supernatant liquid resulting from centrifugation was filtered through a 200 mesh sieve screen, and the solids retained on the screen were placed into a pre-weighed aluminum pan. The weight of the sample obtained from the screen was noted, and the sample together with the aluminum pan was then placed in an oven set to 105° C. and left overnight (approximately 10-14 hours) to dry. The pan and the residue contained therein after drying were weighed after removal from the oven, and the percent water solubles was calculated using the following equation:

% Water Solubility=(Weight of Residue plus Pan-Weight of Pan)*100/Weight of Sample.

In Examples 1-3, the samples subjected to solubility testing were prepared by mixing a selected composition with DI water. Control A, which contained no fiber, was also tested for solubility in DI water. In Examples 4-6, the samples subjected to solubility testing were prepared by mixing a selected composition with salt water (brine), which was prepared by adding 5.84 grams of sodium chloride to 994.16 grams of DI water. Control B, which contained no fiber, was also tested for solubility in brine.

The compositions of Examples 1-6 were prepared by mixing a PVOH resin with fiber. As mentioned, Controls A and B contained no fiber.

The PVOH resin used in the samples tested was an acid-functional polyvinyl alcohol resin available from Kuraray America, Inc. (Houston, TX USA) under the trade designation ELVANOL™ LPE703. The resin is a polyvinyl alcohol-based polymer that is produced as described in previously incorporated US2019/0055326A1, by bypassing the neutralization unit in a slurry production process for PVOH, then fed to a thermal treating unit where the slurry temperature was reduced to less than 50° C., after which it was fed to a solids-liquid separation unit where polyvinyl alcohol was separated from the slurry to generate a polyvinyl alcohol wet cake and separated liquids. The resulting wet cake after centrifugation was fed to a drying unit where it was dried via conventional means to remove sufficient remaining liquid content so that the resulting particulate agglomerated polyvinyl alcohol polymer particles were recovered as a free-flowing powder. The PVOH has a 99.5 mol % hydrolysis, and a viscosity (at 4% and 20° C.) of 20 mPa·s.

After recovery from the dryer, the PVOH resin used for testing herein was sprayed with 1.5 parts of a polyethylene glycol plasticizer (commercially available from The Dow Chemical Company, Freeport, Texas USA under the trade designation CARBOWAX™ polyethylene glycol 200).

To prepare samples for testing, the plasticized polymer was then uniformly blended with 1 wt % of fiber (Examples 1 and 4), 5 wt % of fiber (Examples 2 and 5), or 10 wt % of fiber (Examples 3 and 6).

The fiber that was used in the examples below is Kuralon™ VPB 105-2 PVOH fibers commercially available from Kuraray Co., Ltd. of Osaka, Japan. As mentioned, Controls A and B contained no fiber.

Samples to be tested were further subjected to compaction by placing the admixed components thereof between two counter-rotating rolls of a double roll compactor. The rolls applied 20 T of pressure to press the mixture into a sheet-like form. This sheet of material was then fed through a granulator, where it was broken up into granules that were approximately 6-8 mesh in size and were random in shape but approximately uniform in size. A screener sorted the agglomerated particles according to size. Particles that fell outside the desired size range were recycled from the screener back to the compactor.

The solubility of all samples was determined according to the procedure described above in either deionized water or brine at 149° F. Results are shown in Table 1 (DI water solubility) and Table 2 (brine solubility).

TABLE 1

Percent of Solubility in Deionized Water @ 149° F.

| Sample | Time (minutes) | | | | | | |
|---|---|---|---|---|---|---|---|
| | 15 | 30 | 60 | 120 | 180 | 240 | 300 |
| Control A | 96.6 | 97.8 | 98.9 | 99.4 | 99.8 | 100 | 100 |
| Example-1 | 70.9 | 76.4 | 80.8 | 86.2 | 86.6 | 90.0 | 90.6 |
| Example 2 | 80.7 | 83.2 | 85.4 | 86.9 | 89.5 | 90.0 | 92.5 |
| Example 3 | 67.4 | 72.3 | 81.7 | 88.5 | 89.7 | 91.5 | 92.1 |

TABLE 2

Percent of Solubility in Brine @ 149° F.

| Sample | Time (minutes) | | | | | | |
|---|---|---|---|---|---|---|---|
| | 15 | 30 | 60 | 120 | 180 | 240 | 300 |
| Control B | 93.6 | 97.6 | 97.9 | 98.1 | 98.2 | 99.9 | 100.0 |
| Example 4 | 68.4 | 77.1 | 83.1 | 90.2 | 94.2 | 96.0 | 98.8 |
| Example 5 | 77.4 | 79.9 | 86.3 | 89.0 | 89.8 | 90.2 | 90.7 |
| Example 6 | 71.9 | 74.3 | 82.9 | 90.8 | 94.6 | 95.0 | 95.4 |

The invention claimed is:

1. A composition comprising a blend of a particulate polyvinyl alcohol component and a fiber component, wherein the particulate polyvinyl alcohol component comprises a polyvinyl alcohol resin and from about 0.5 wt % to about 40 wt % of a plasticizer comprising one or more selected from the group consisting of water, glycerol, polyglycerol, ethylene glycol, polyethylene glycols, ethanol acetamide, ethanol formamide, and acetates of triethanolamine, glycerin, trimethylolpropane, and neopentyl glycol, and the fiber component comprises one or more fibers.

2. The composition of claim 1, wherein the particulate polyvinyl alcohol component comprises one or more acid-functional polyvinyl alcohol resins.

3. The composition of claim 1, wherein the fiber component comprises a fiber characterized by (i) a water dissolution temperature of about 60° C. or more and yet about 100° C. or less; and/or (ii) a fiber fineness in the range of about 0.1 dtex (g/10 km) or more and yet about 20 dtex or less; and/or (iii) an average fiber diameter in the range of about 5 microns or more and yet about 25 microns or less; and/or (iv) a cut length in the range of about 0.5 mm or more and yet about 30 mm or less; and/or (v) a tensile strength of at least about 2.5 cN/dtex.

4. The composition of claim 3, wherein the fiber component comprises a fiber characterized by (i) a water dissolution temperature of about 60° C. or more and yet about 100° C. or less; (ii) a fiber fineness in the range of about 0.1 dtex (g/10 km) or more and yet about 20 dtex or less; (iii) an average fiber diameter in the range of about 5 microns or more and yet about 25 microns or less; (iv) a cut length in the range of about 0.5 mm or more and yet about 30 mm or less; and (v) a tensile strength of at least about 2.5 cN/dtex.

5. The composition of claim 4, wherein the fiber component comprises a fiber characterized by a ratio of length to diameter in the range of about 15 or more and yet about 600 or less.

6. The composition of claim 1, wherein the fiber component comprises a fiber characterized by a ratio of length to diameter in the range of about 15 or more and yet about 600 or less.

7. The composition of claim 1, wherein the fiber component comprises two or more different fibers, wherein each fiber has a different cut length, and wherein at least one pair of the two or more fibers is characterized by a ratio of the different lengths that is in the range of about 0.5 or more and yet about 20 or less.

8. The composition of claim 1, wherein the fiber component comprises one or more fibers selected from the group consisting of: (a) a polyvinyl alcohol polymer-based fiber, and (b) a vinyl alcohol/aliphatic polyester copolymer fiber.

9. The composition of claim 8, wherein the fiber component comprises a physical blend of a polyvinyl alcohol polymer-based fiber and an aliphatic polyester-based fiber.

10. The composition of claim 1, wherein the particles of the of the particulate polyvinyl alcohol component are characterized in that at least about 97.5 wt % of particles have a particle size of 325 mesh or larger, at least about 95 wt % of the particles have a particle size of 140 mesh or larger, and at least about 75 wt % of the particles have a particle size of 35 mesh or larger.

11. The composition of claim 1, wherein the ratio of the weight of the particulate polyvinyl alcohol component to the weight of the fiber component is at least about 1 and yet is about 99 or less.

12. A kit to prepare the composition of claim 1, the kit comprising a supply of a particulate polyvinyl alcohol component and a supply of a fiber component that is suitable for interaction with the particulate polyvinyl alcohol component for the purpose of wellbore remediation, wherein the particulate polyvinyl alcohol component comprises a polyvinyl alcohol resin and a plasticizer, and the fiber component comprises one or more fibers.

13. The kit of claim 12, wherein the particulate polyvinyl alcohol component comprises one or more acid-functional polyvinyl alcohol resins.

14. The kit of claim 13, wherein the acid-functional polyvinyl resin polyvinyl alcohol resin has (i) a degree of solubility in deionized water at a temperature in the range of about 50° C. to about 70° C. of at least about 3 wt % and yet not more than about 30 wt %; and (ii) a degree of solubility in deionized water at a temperature in the range of about 90° C. to about 110° C. of at least about 75 wt % and yet not more than about 100 wt %.

15. The kit of claim 12, wherein the fiber component comprises a fiber characterized by (i) a water dissolution temperature of about 60° C. or more and yet about 100° C. or less; and/or (ii) a fiber fineness in the range of about 0.1 dtex (g/10 km) or more and yet about 20 dtex or less; and/or (iii) an average fiber diameter in the range of about 5 microns or more and yet about 25 microns or less; and/or (iv) a cut length in the range of about 0.5 mm or more and yet about 30 mm or less; and/or (v) a tensile strength of at least about 2.5 cN/dtex.

16. The kit of claim 12, wherein the fiber component comprises one or more fibers selected from the group consisting of: (a) a polyvinyl alcohol polymer-based fiber, and (b) a vinyl alcohol/aliphatic polyester copolymer fiber.

17. The kit of claim 12, wherein the particles of the of the particulate polyvinyl alcohol component are characterized in that at least about 97.5 wt % of particles have a particle size of 325 mesh or larger, at least about 95 wt % of the particles have a particle size of 140 mesh or larger, and at least about 75 wt % of the particles have a particle size of 35 mesh or larger.

18. A method of reducing the flow of fluid from a wellbore installed within a subterranean, geologic formation into the formation through an opening in a wall of the wellbore, comprising a step of introducing into the opening the composition of claim 1.

19. A composition comprising a blend of a particulate polyvinyl alcohol component and a fiber component, wherein the particulate polyvinyl alcohol component comprises a plasticizer and an at least partially hydrolyzed copolymer of vinyl acetate with one or more acid-functional comonomers comprising one or more selected from the group consisting of a dicarboxylic unsaturated acid, an alkyl ester of a monocarboxylic unsaturated acid, an alkyl ester of a dicarboxylic unsaturated acid, an alkali metal salt of a monocarboxylic unsaturated acid, an alkali metal salt of a dicarboxylic unsaturated acid, an alkaline earth metal salt of a monocarboxylic unsaturated acid, an alkaline earth metal salt of a dicarboxylic unsaturated acid, an anhydride of a monocarboxylic unsaturated acid, and an anhydride of a dicarboxylic unsaturated acid, and wherein the fiber component comprises one or more fibers.

20. The composition of claim 19, wherein the acid-functional polyvinyl alcohol resin has (i) a degree of solubility in deionized water at a temperature in the range of about 50° C. to about 70° C. of at least about 3 wt % and yet not more than about 30 wt %; and (ii) a degree of solubility in deionized water at a temperature in the range of about 90° C. to about 110° C. of at least about 75 wt % and yet not more than about 100 wt %.

21. The composition of claim 19, wherein the one or more acid-functional comonomers further comprises a monocarboxylic unsaturated acid.

22. The composition of claim 19, wherein the one or more acid-functional comonomers comprise at least one selected from the group consisting of an alkyl ester of a monocarboxylic unsaturated acid, an alkyl ester of a monocarboxylic unsaturated acid, an alkali metal salt of a monocarboxylic unsaturated acid, an alkaline earth metal salt of a monocarboxylic unsaturated acid, and an anhydride of a monocarboxylic unsaturated acid.

23. A composition comprising a blend of a particulate polyvinyl alcohol component and a fiber component, wherein the particulate polyvinyl alcohol component comprises a polyvinyl alcohol resin and a plasticizer comprising one or more selected from the group consisting of glycerol, polyglycerol, ethylene glycol, polyethylene glycols, ethanol acetamide, ethanol formamide, and acetates of triethanolamine, glycerin, trimethylolpropane, and neopentyl glycol, and the fiber component comprises one or more fibers.

* * * * *